(12) United States Patent
Nagarajan et al.

(10) Patent No.: US 10,476,793 B2
(45) Date of Patent: *Nov. 12, 2019

(54) MULTICAST FLOW OVERLAY USING REGISTRATION OVER A RELIABLE TRANSPORT

(71) Applicant: Juniper Networks, Inc., Sunnyvale, CA (US)

(72) Inventors: Vikram Nagarajan, Bangalore (IN); Anish Peter, Bangalore (IN); Robert W. Kebler, Newburyport, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,993

(22) Filed: Nov. 17, 2017

(65) Prior Publication Data

US 2018/0077060 A1 Mar. 15, 2018

Related U.S. Application Data

(63) Continuation of application No. 14/728,021, filed on Jun. 2, 2015, now Pat. No. 9,843,513.

(30) Foreign Application Priority Data

Mar. 20, 2015 (IN) .......................... 1411/CHE/2015

(51) Int. Cl.
*H04L 12/741* (2013.01)
*H04L 12/751* (2013.01)
*H04L 12/18* (2006.01)

(52) U.S. Cl.
CPC .............. *H04L 45/74* (2013.01); *H04L 12/18* (2013.01); *H04L 45/026* (2013.01)

(58) Field of Classification Search
CPC ...... H04L 47/2416; H04L 47/14; H04L 45/74; H04L 12/18; H04L 45/026; H04L 45/16;
(Continued)

(56) References Cited

U.S. PATENT DOCUMENTS 7,818,757 B1 10/2010 Tsimelzon et al.
8,374,116 B2 2/2013 Kitchin et al.
(Continued)

OTHER PUBLICATIONS

Aggarwal et al., "1Pv4 and 1pv6 Infrastructure Addresses in BGP Updates for Mulicast VPN," RFC 6515, Internet Engineering Task Force (IETF), Feb. 2012, 8 pp.
(Continued)

*Primary Examiner* — Sai Ming Chan
(74) *Attorney, Agent, or Firm* — Shumaker & Sieffert, P.A.

(57) ABSTRACT

An example method includes exchanging targeted hello messages to establish a targeted neighbor connection between a first routing device and a second routing device, wherein one of the routing devices comprises a central routing device, and wherein another one of the routing devices comprises an ingress routing device. The example method further includes processing a source-active register message that specifies a source address and an identifier that are collectively associated with a multicast stream, and wherein the source-active register message further indicates whether the multicast stream is active or withdrawn. After processing the source-active register message, the example method further includes processing a list-of-receivers register message that specifies an egress routing device and at least the identifier that is associated with the multicast stream, wherein the list-of-receivers register message further indicates whether or not the egress routing device requests receipt of data associated with the multicast stream.

30 Claims, 14 Drawing Sheets

(58) Field of Classification Search
CPC .. H04L 45/42; H04N 5/23238; H04N 13/376; H04N 13/117; H04N 13/194; H04N 13/38
USPC .......................................................... 370/328
See application file for complete search history.

(56) References Cited

U.S. PATENT DOCUMENTS

| | | | |
|---|---|---|---|
| 8,510,551 | B1 | 8/2013 | Desai et al. |
| 8,537,816 | B2 | 9/2013 | Anumala et al. |
| 8,625,465 | B1 | 1/2014 | Aggarwal et al. |
| 9,660,898 | B2 | 5/2017 | Peter et al. |
| 9,832,290 | B2 | 11/2017 | Manur et al. |
| 9,843,513 | B2 | 12/2017 | Nagarajan et al. |
| 2005/0141545 | A1 | 6/2005 | Fein et al. |
| 2007/0211735 | A1 | 9/2007 | Williamson |
| 2008/0175240 | A1 | 7/2008 | Suzuki |
| 2009/0103468 | A1 | 4/2009 | Kasapidis |
| 2010/0054245 | A1 | 3/2010 | Asati et al. |
| 2010/0303072 | A1 | 12/2010 | Jokela et al. |
| 2011/0228770 | A1 | 9/2011 | Dholakia et al. |
| 2011/0286450 | A1* | 11/2011 | Wijnands ............ H04L 45/02 370/390 |
| 2013/0188638 | A1* | 7/2013 | Venaas ............... H04L 45/16 370/390 |
| 2014/0254591 | A1 | 9/2014 | Mahadevan et al. |
| 2014/0269412 | A1 | 9/2014 | Venaas et al. |
| 2015/0085640 | A1 | 3/2015 | Song |
| 2017/0093689 | A1 | 3/2017 | Manur et al. |

OTHER PUBLICATIONS

Aggarwal et al., "BGP Encodings and Procedures for Multicast in MPLS/BGP IP VPNs," RFC 6514, Internet Engineering Task Force (IETF), Feb. 2012, 59 pp.

Extended Search Report from counterpart European Application No. 16160624.9, dated Jun. 8, 2016, 13 pp.

Farinacci et al, "A Reliable Transport Mechanism for PIM," RFC 6559, Internet Engineering Task Force, Mar. 2012, 29 pp.

Fenner et al., "Protocol Independent Multicast-Sparse Mode (PIM-SM): Protocol Specification (Revised)," RFC 4601, Network Working Group, Aug. 2006, 112 pp.

Macker ,Simplified Multicast Forwarding, RFC 6621, Internet Engineering Task Force, May 18, 2012, 55 pp.

Peter et al., "PIM source discovery in Last-Hop-Router, draft-anish-pim-stream-discovery-00," Internet-Draft, Protocol Independent Multicast (pim), Mar. 9, 2015, 11 pp.

Peter et al., "Reliable Transport for PIM Register States, draft-anish-reliable-pim-registers-00," Internet-Draft, Protocol Independent Multicast (pim), Mar. 9, 2015, 19 pp.

Response to Communication pursuant to Rule 69 EPC dated Sep. 26, 2016, from counterpart European Application No. 16160624.9, filed on Mar. 21, 2017, 26 pp.

Sarikaya et al., "Multicast Support for Mapping of Address and Port Protocol and Light Weight 4over6," Internet Draft, Network Working Group, Sep. 29, 2014, 25 pp.

Serbest et al., "Supporting IP Multicast over VPLS," Internet-Draft, Internet Engineering Task Force, Jul. 1, 2005, 47 pp.

Wijnands et al., "Multicast using Bit Index Replication,draft-wijnands-bier-architecture-04," Internet-Draft, Internet Engineering Task Force, Feb. 2, 2015, 30 pp.

Wijnands et al., "PIM flooding mechanism and source discovery, draft-ietf-pim-source-discovery-bsr-01," Network Working Group, Jul. 3, 2014, 10 pp.

Examination Report from counterpart European Application No. 16160624.9, dated Nov. 27, 2017, 6 pp.

Prosecution History from U.S. Pat. No. 9,660,898, dated Aug. 19, 2016 through Mar. 15, 2017, 47 pp.

Prosecution History from U.S. Pat. No. 9,843,513, dated Dec. 1, 2016 through Nov. 8, 2017, 170 pp.

Intent to Grant dated May 8, 2018, from counterpart European Application No. 16160624.9, 74 pp.

Extended European Search Report dated Jan. 18, 2019 in counterpart EP Application No. 18196980.9, 12 pp.

Response to the Extended European Search Report dated Jan. 18, 2019, filed Sep. 4, 2019 in counterpart EP Application No. 18196980.9, 32 pp.

* cited by examiner

TARGETED HELLO MESSAGE TLV

| TYPE 300 || LENGTH 302 ||
|---|---|---|---|
| F 304 | R 306 | RESERVED 308 | EXP 310 |

FIG. 7

EXAMPLE PACKET FORMAT FOR RECEIVER-ACTIVE REGISTER MESSAGE

| PIM VER 430 | TYPE 432 | RESERVED 434 | CHECKSUM 436 |
|---|---|---|---|
| A 438 | RESERVED 440 | | # GROUPS 442 |
| IDENTIFIER (GROUP ADDRESS) 444 | | | |
| SOURCE ADDRESS 446 | | | |
| EGRESS ROUTING DEVICE 450A | | | |
| ... | | | |
| EGRESS ROUTING DEVICE 450N | | | |

FIG. 9

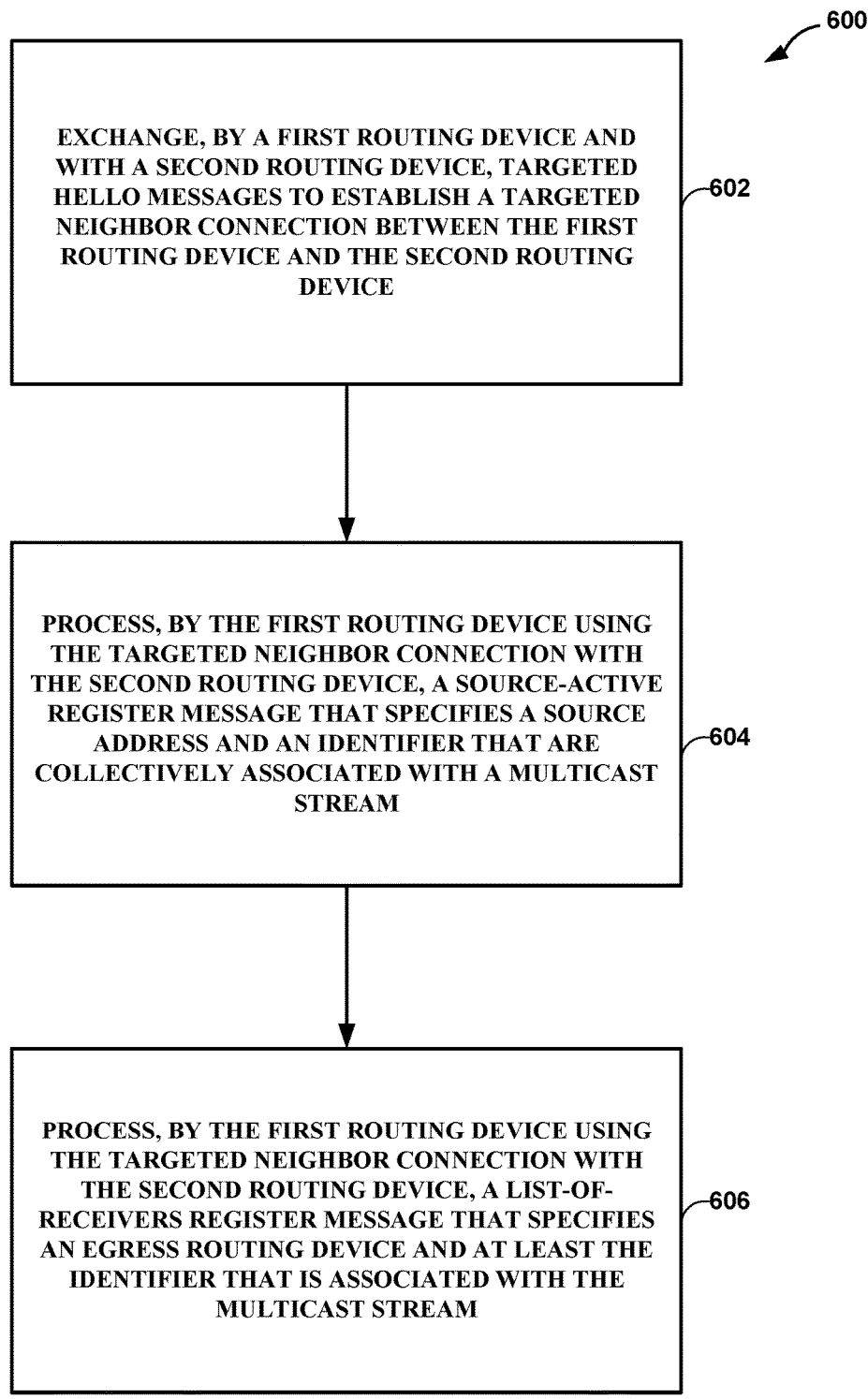

MULTICAST FLOW OVERLAY USING REGISTRATION OVER A RELIABLE TRANSPORT

This application is a continuation of U.S. application Ser. No. 14/728,021, filed Jun. 2, 2015 which claims the benefit of Indian Application No. 1411/CHE/2015, filed Mar. 20, 2015, the entire contents of each are incorporated herein by reference in their entirety.

TECHNICAL FIELD

This disclosure relates to computer networks, and, more particularly, to transmission of multicast stream data over such networks.

BACKGROUND

A computer network is a collection of interconnected computing devices that exchange data and share resources. In a packet-based network, the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPN's), local area network (LAN's), virtual LANs (VLAN's) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. As an example, the computer network may utilize Protocol Independent Multicast (PIM) as a multicast routing protocol to build distribution trees through the computer network to transport multicast traffic from sources to receivers or subscriber devices for particular multicast groups. PIM may operate in several different modes, including Dense Mode (DM), Sparse Mode (SM), Source-Specific Mode (SSM), and Bidirectional Mode (BIDIR). PIM SM may also support Any-Source Multicast (ASM) mode.

Bitwise Index Explicit Replication (BIER) specifies a particular type of architecture for the forwarding of multicast data packets. BIER provides forwarding of multicast packets through a multicast domain, but it does not necessarily require any explicit tree-building protocol, and it also does not necessarily require intermediate nodes to maintain per-flow states.

SUMMARY

In one example, a method includes exchanging, by a first routing device and with a second routing device, a plurality of targeted hello messages to establish a targeted neighbor connection between the first routing device and the second routing device, wherein one of the first routing device or the second routing device comprises a central routing device, and wherein another one of the first routing device or the second routing device comprises an ingress routing device communicatively coupled to at least one source device. The example method further includes processing, by the first routing device using the targeted neighbor connection with the second routing device, a source-active register message that specifies a source address and an identifier that are collectively associated with a multicast stream provided by the at least one source device, and wherein the source-active register message further indicates whether the multicast stream is active or withdrawn. After processing the source-active register message, the method further includes processing, by the first routing device using the targeted neighbor connection with the second routing device, a list-of-receivers register message that specifies an egress routing device and at least the identifier that is associated with the multicast stream, wherein the list-of-receivers register message further indicates whether or not the egress routing device requests receipt of data associated with the multicast stream.

In one example, a first routing device comprises a memory and at least one processor in communication with the memory. The at least one processor is configured to exchange, with a second routing device, a plurality of targeted hello messages to establish a targeted neighbor connection between the first routing device and the second routing device, wherein one of the first routing device or the second routing device comprises a central routing device, and wherein another one of the first routing device or the second routing device comprises an ingress routing device communicatively coupled to at least one source device, and to process, using the targeted neighbor connection with the second routing device, a source-active register message that specifies a source address and an identifier that are collectively associated with a multicast stream provided by the at least one source device, wherein the source-active register message further indicates whether the multicast stream is active or withdrawn. The at least one processor is further configured to, after processing the source-active register message, process, using the targeted neighbor connection with the second routing device, a list-of-receivers register message that specifies an egress routing device and at least the identifier that is associated with the multicast stream, wherein the list-of-receivers register message further indicates whether or not the egress routing device requests receipt of data associated with the multicast stream.

In one example, a computer-readable storage medium comprising instructions that, when executed, cause one or more processors of a first routing device to perform operations. The operations comprise exchanging, by a first routing device and with a second routing device, a plurality of targeted hello messages to establish a targeted neighbor connection between the first routing device and the second routing device, wherein one of the first routing device or the second routing device comprises a central routing device, and wherein another one of the first routing device or the second routing device comprises an ingress routing device communicatively coupled to at least one source device, and processing, by the first routing device using the targeted neighbor connection with the second routing device, a source-active register message that specifies a source address and an identifier that are collectively associated with a multicast stream provided by the at least one source device, wherein the source-active register message further indicates whether the multicast stream is active or withdrawn. The operations further comprise after processing the source-active register message, processing, by the first routing device using the targeted neighbor connection with the second routing device, a list-of-receivers register message that specifies an egress routing device and at least the identifier that is associated with the multicast stream, wherein the list-of-receivers register message further indicates whether or not the egress routing device requests receipt of data associated with the multicast stream.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 is a conceptual diagram illustrating an example representation of a targeted hello message.

FIG. 9 is a conceptual diagram illustrating another example representation of a register message.

FIG. 12 is a flow diagram illustrating an example process that may be implemented by a routing device, such as by one or more of the routing devices shown in FIGS. 1-6.

DETAILED DESCRIPTION

Figure 1:
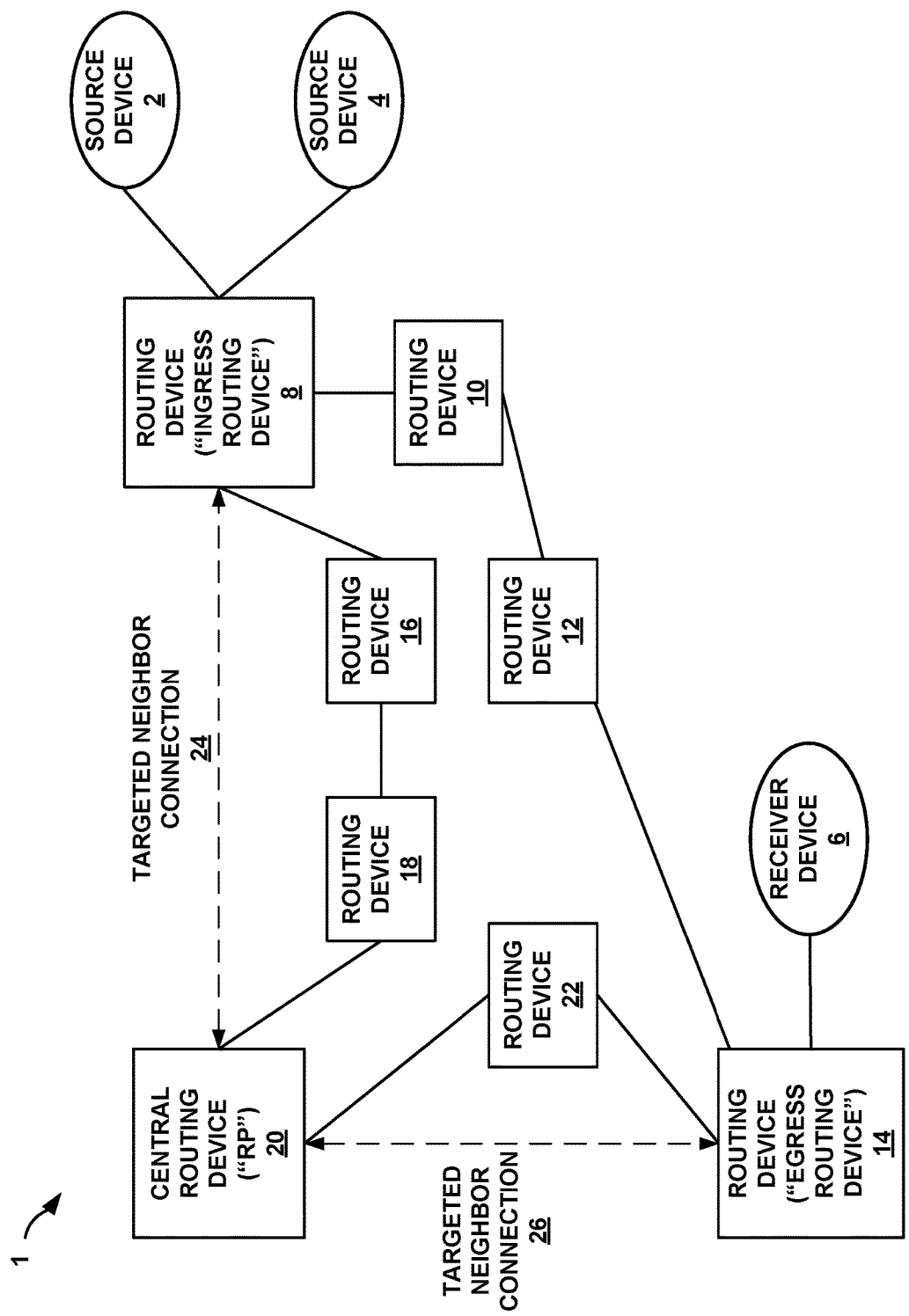
FIG. 1 is a block diagram illustrating an example network comprising multiple routing devices in which one such device, a central routing device, establishes respective targeted neighbor connections with an ingress routing device and an egress routing device.

The techniques of the present disclosure provide reliable targeted neighbor connections between routing devices through the exchange of periodic targeted hello messages using, as one non-limiting example, a Protocol Independent Multicast (PIM) protocol, which may, in some instances, provide capability negotiation and discovery between the routing devices. These routing devices may be separated by one or more intermediary routing devices, and therefore may be multiple hops away from each other. In one example, the techniques extend the concepts of Internet Engineering Task Force RFC 6559 ("A Reliable Transport Mechanism for PIM," Farinacci et al., March 2012, hereinafter "RFC 6559"), the entire content of which is incorporated herein by reference, to allow PIM registration state information to be sent over a reliable transport connection (e.g., targeted neighbor connection), which may potentially provide more scalability for certain multicast services like customer multicast, Internet-protocol television (IPTV), content replication between data centers, and the like. The techniques may also extend or otherwise be associated with the concepts of Internet Engineering Task Force Draft ("Multicast Using Bit Index Explicit Replication" Wijnands et al., Internet Draft, February 2015, Expires Aug. 6, 2015, hereinafter the "BIER Specification"), the entire content of which is incorporated herein by reference. In addition, the techniques may also extend or otherwise be associated with the concepts of "Reliable Transport for PIM Register States draft-anish-reliable-pim-registers-00," Peter et al., Internet Draft, Mar. 9, 2015, Juniper Networks, Inc., Expires Sep. 10, 2015 (hereinafter "Reliable Transport for PIM Register States"), the entire content of which is incorporated herein by reference.

In the BIER architecture, an ingress routing device (e.g., a PIM First Hop Router) may receive multicast data packets for a particular group outside of a particular BIER domain. One or more egress routing devices (e.g., PIM Last Hop Routers) may interested in receiving multicast data packets for this particular group. The ingress routing device learns of these egress routing devices using a mechanism called the BIER multicast flow overlay, and is then capable of building a BIER multicast packet header and forwarding a multicast data packet, which includes the packet header, to the interested egress routing devices in the BIER domain. The interested egress routing devices each receive the multicast data packet and forward it to a respective receiver device. The BIER domains can be divided into subdomains, in which case the ingress routing device sends the multicast data packets to the interested egress routing devices in the given subdomain, which may be identified by a subdomain identifier.

The BIER Specification describes three components: (1) a routing underlay; (2) a BIER layer; and (3) a multicast flow overlay. The routing underlay provides the adjacency establishment procedures between the participating routing devices in the BIER domain, which may typically be the unicast Interior Gateway Protocol (IGP). In various examples, all ingress routing devices, egress routing devices, and transit routing devices participate in IGP-based BIER signaling. The BIER layer includes the protocol and procedures that are used in order to transmit a multicast data packet across a BIER domain, from ingress routing devices to egress routing devices. The BIER Specification describes the BIER layer in detail.

The multicast flow overlay component includes the procedures and protocols related to the determination, by an ingress routing device, of the set of egress routing devices that are interested in receiving a multicast data packet received by the ingress routing device outside its BIER domain. Border Gateway Protocol for Multicast Virtual Private Network (BGP-MVPN) procedures can be taken as one of the mechanisms that provide multicast flow overlay for BIER. Further details related BGP-MVPN may be found in the following documents, the entire content of each of which is incorporated herein by reference: (1) Internet Engineering Task Force RFC 6514 ("BGP Encodings and Procedures for Multicast in MPLS/BGP IP VPN's," Aggarwal et al., February 2012, hereinafter "RFC 6514"); and (1) Internet Engineering Task Force RFC 6515 ("IPv4 and IPv6 Infrastructure Addresses in BGP Updates for Multicast VPN," Aggarwal et al., February 2012, hereinafter "RFC 6515"). BGP-MVPN provides a signaling mechanism that is used between sites to exchange multicast receiver and sender information. The signaling is via BGP and is more in the context of VPN's.

The BIER Specification, however, does not define or describe the details of multicast flow overlay for certain implementations (e.g., implementations for PIM, Virtual eXtensible Local Area Network (VxLAN), non-MVPN,) or deployments where BGP-MVPN is not feasible. The techniques described herein address this deficiency and provide a multicast flow overlay approach that can be used in BIER domains for certain multicast deployments (e.g., PIM, VxLAN, non-MVPN, MVPN topology where BGP-MVPN is not preferred or feasible).

As described in further detail below, to implement a multicast flow overlay for such BIER deployments, the techniques herein provide a central routing device (e.g., a Rendezvous Point (RP) or Controller). Egress routing devices may express interest in a particular group or source/group to the central routing device, and the central routing device is then able to update the ingress routing devices about the respective interested egress routing devices. Using a PIM RP for the role of a central routing device is well suited in many instances, as a part of this functionality is already performed on by a PIM RP per the existing Network Working Group RFC 4601 ("Protocol Independent Multicast-Sparse Mode (PIM-SM): Protocol Specification (Revised)," Fenner et al., August 2006, hereinafter "RFC 4601"), the entire content of which is incorporated herein by reference.

In various examples, the techniques use separate communication channels built on targeted hello adjacency between a central routing device and an ingress routing device, as well as on targeted hello adjacency between the central routing device and an egress routing device. The separate communication channels may be based on reliable PIM register messages, as further described below, although other approaches, such as those implementing BGP and Multicast Source Discovery Protocol (MSDP), may also be utilized.

In this disclosure, in various examples associated with PIM implementations, the term "ingress routing device" may be used inter-changeably with a PIM First Hop Router (FHR), and the term egress routing device may be used inter-changeably with a PIM Last Hop Router (LHR). In VxLAN scenarios, the ingress routing device and the egress routing device may map to respective provider edge routers (PE's).

As one example, after sending an initial targeted hello message to a central routing device, an ingress routing device listens for the central routing device to connect to the primary address of the ingress routing device. Once the central routing device connects to the ingress routing device, a targeted neighbor connection, which may comprise a reliable transport connection, is established between the two devices, where, in some cases, the ingress routing device may have the active role, while the central routing device may have the passive role. The reliable connection may, in some instances, be maintained with keep-alive messages, as outlined in RFC 6559.

Once this reliable connection is established, the ingress routing device may start sending, to the central routing device, the source and group addresses of multicast streams that are active with the ingress routing device. When any of these streams are later withdrawn, the ingress routing device sends an update message to the central routing device to provide the source and group addresses associated with the streams that have been withdrawn. In this way, after a targeted neighbor connection is established between the ingress routing device and the central routing device, the ingress routing device is capable of updating the central routing device with its existing and active multicast streams. Subsequently, the ingress routing device sends incremental updates about any changes to the status of these streams to the central routing device. In various examples, the messages sent by the ingress routing device to the central routing device via the reliable connection may be referred to as reliable register messages.

Similarly, the central routing device and an egress routing device may exchange targeted hello messages and establish a targeted neighbor connection. Once this reliable connection is established, the egress routing device may start sending, to the central routing device, the source and group addresses of multicast streams that are of interest to the egress routing device. Subsequently, the egress routing device may send incremental updates to the central routing device to indicate interest or to withdraw interest in source/group addresses of particular multicast streams. In some cases, the source address may comprise a wildcard address, indicating that the egress routing device is interested in data from any source for a particular group.

The implementation of these techniques may, in some cases, provide a hard-state, reliable transport mechanism to supplement and/or replace the use of existing register messages in PIM Sparse Mode (SM) and potentially eliminate the need for the usage of register-stop or null-register messages between the central routing device and the ingress/egress routing devices. The techniques may also provide a multicast flow overlay approach that can be used in BIER domains for certain multicast deployments (e.g., PIM, VxLAN, non-MVPN, MVPN topology where BGP-MVPN is not preferred or feasible).

In some examples, multiple different central routing devices that share the same anycast address may exchange targeted hello messages to establish a full mesh of targeted neighbor connections between these central routing devices. In addition, in certain examples, the techniques allow an ingress routing device or an egress routing device to discover the primary address of a central routing device operating in an Any Source Multicast (ASM) mode through the exchange of targeted hello messages.

FIG. 1 is a block diagram illustrating an example network 1 comprising multiple routing devices 8, 10, 12, 14, 16, 18, 20, and 22 in which one such device, a central routing device 20, establishes respective targeted neighbor connections with an ingress routing device 8 and an egress routing device 14. Routing devices 8, 10, 12, 14, 16, 18, 20, and 22 are each configured to route multicast traffic between a source device and a receiver device, and one or more of such devices may comprise edge routers and/or core routers. Examples of multicast traffic may include content for Internet Protocol Television (IPTV), desktop conferences, corporate broadcasts, music and video web casts, and other forms of multimedia content. Furthermore, network 1 may comprise one or more BIER domains and/or subdomains.

Source devices 2, 4 are communicatively coupled to routing device 8, and therefore routing device 8 is referred to as an ingress routing device in this example. Receiver device 6 is communicatively coupled to routing device 14, and therefore routing device 14 is referred to as an egress routing device in this example. In various examples, central routing device 20 is configured to operate as a rendezvous point (RP) and may therefore be referred to as RP 20. Although only one ingress routing device 8 and one egress routing device 14 are shown in FIG. 1, in other examples, any number of ingress routing devices and egress routing devices may be communicatively coupled to central routing device 20 via one or more intermediary routing devices, such as routing devices 10, 12, 16, 18, and 22. Similarly, although only one central routing device 20 is shown in FIG. 1, in other examples, any number of central routing devices may be included in network 1 and communicatively coupled to ingress routing device 8 and/or egress routing device 14. In some examples, if central routing device 20 is configured as an RP, one or more other RP's in network 1 may share an anycast address with central routing device 20.

Network 1 may be an enterprise network, a campus network, a service provider network, a home network, or another autonomous system. In any of these examples, source devices 2, 4 and receiver 6 may share data via network 1. In one example of network 1 as an enterprise network, each of source devices 2, 4 and receiver device 6 may comprise one or more servers or employee computer terminals located in different regions of a single office location. In another example of network 1 as an enterprise network, each of source devices 2, 4 and receiver device 6 may comprise a remote office location of a corporation such that enterprise network 1 may be extended across a public network, such as the Internet. Additionally, however, the techniques of this disclosure are applicable to other network types, both public and private. Examples of other network types include local area networks (LAN's), virtual local area networks (VLAN's), virtual private networks (VPN's), and the like. In some examples, network 1 may be coupled to one or more additional private or public networks, e.g., the Internet. In other examples, network 1 may comprise the Internet or another public network. In some cases, network 1 may comprise a multi-protocol label switching (MPLS) network.

PIM may operate in several different modes, such as Sparse Mode (SM), which may also support Any-Source Multicast (ASM). Central routing device 20 is a routing device toward which multicast traffic from source devices 2, 4 and receiver devices 6 may rendezvous. In the illustrated example, central routing device 20, ingress routing device 8, egress routing device 14, and routing devices 10, 12, 16, 18, and 22 carry multicast traffic through computer network 1 from source devices 2, 4 to receiver device 6. The traffic may flow through one or more paths or routes that transport multicast traffic upstream, e.g., from source devices 2, 4 via ingress routing device 8 towards central routing device 20, as well as downstream, e.g., away from central routing device 20 towards receiver device 6 via egress routing device 14.

Receiver device 6 may subscribe to one or more multicast groups to receive multicast traffic. Central routing device 20 may learn and store source addresses associated with source devices (e.g., source devices 2, 4) for a certain range of multicast groups to which receiver device 6 expresses interest. Central routing device 20, ingress routing device 8, egress routing device 14, and routing devices 10, 12, 16, 18, and 22 may communicate using PIM control messages.

The techniques of the present disclosure introduce the concept of a targeted neighbor connection, which may comprise a reliable transport connection, between a first routing device, such as central routing device 20, and a second routing device, such as ingress routing device 8 or egress routing device 14, with an improved message format (e.g., type-length-value, or TLV, based message format) through the implementation of targeted hello messages. These routing devices may be separated by one or more other intermediary routing devices, and therefore may be multiple hops away from each other. For example, central routing device 20 and ingress routing device 8 may be separated by one or more routing devices, such as routing devices 16 and 18 shown in FIG. 1. In one example, the techniques allow multicast stream state information to be sent over such a targeted neighbor connection, which may provide more scalability for certain multicast services like customer multicast, Internet-protocol television (IPTV), content replication between data centers, and the like.

Once ingress routing device 8 learns of a list of egress routing devices (e.g., egress routing device 14) that are interested in a particular multicast group or source/group, ingress routing device 8 is able to build a bitmap based on the list of egress routing devices and form a Bier multicast packet header, as outlined in the BIER Specification. Ingress routing device 8 uses this BIER header on the multicast data packets and forwards them to the next hop downstream routers according to the BIER routing underlay and/or BIER layer, such that these packets reach the respective egress routing devices.

In various examples, egress routing device 14 builds a targeted adjacency with central routing device 20. Similarly, ingress routing device 8 builds a targeted adjacency with central routing device 20. Egress routing device 14 informs its "receiver interest" about a particular multicast group and/or multicast source/group to central routing device 20 (e.g., via the use of a receiver-active register message), and central routing device 20 tracks the "receiver interest" of egress routing device 14. Ingress routing device 8 also informs its "source active" about a particular multicast source/group to central routing device 20 (e.g., via the use of a source-active register message), and central routing device 20 tracks the "source active" information of ingress routing device 8.

Central routing device 20 then informs ingress routing device 8 about any egress routing devices that have expressed "receiver interest" for a multicast group and/or multicast source/group by sending ingress routing device 8 a "list of receivers" register message. Ingress routing device 8 receives this information, forms a BIER header, and sends out multicast data packets using this BIER header to the egress routing devices indicated in the "list of receivers" register message. Thus, if ingress routing device 8 had sent a source-active register message to central routing device 20 indicating that a particular source/group is active at ingress routing device 8, and egress routing device 14 had sent a receiver-active register message to central routing device 20 indicating interest in the group or particular source/group, central routing device 20 would specify egress routing device 14 in the "list of receivers" register message that is sent to ingress routing device 8, such that ingress routing device 8 may send multicast data packets for this group to egress routing device 14 using a corresponding BIER header.

In some instances, there can be multiple ingress routing devices sending traffic for a particular multicast flow (e.g., group or source/group). In these instances, central routing device 20 may update each ingress routing device about the "receiver interests" from egress routing devices (e.g., by sending a "list of receivers" register message to each such ingress routing device.

The techniques herein also provide tracking of ingress routing devices and egress routing devices, as will be described in further detail below. For example, at any point, new egress routing devices can come online and new ingress routing devices can also come online for the same particular multicast flow. Similarly, existing ingress and/or egress routing devices can also go offline. In these cases, central routing device 20 tracks such events (e.g., in a database) and can update the appropriate ingress routing devices and/or egress routing devices with the updated information, as will be described in further detail below.

As shown in FIG. 1, a first routing device (e.g., central routing device 20) may exchange, with a second routing device (e.g., ingress routing device 8) in network 1, targeted hello messages (e.g., using a PIM protocol) to establish a targeted neighbor connection 24 between the first routing device and the second routing device. These targeted hello messages may be similar to PIM hello messages defined in RFC 4601. The targeted hello messages of the present disclosure, however, are not confined to the link level, but instead may exist at an interface level and have a unicast address as the destination address and traverse multiple hops using unicast routing (e.g., via routing device 16, 18) to reach a targeted hello neighbor (e.g., central routing device 20 or ingress routing device 8) identified by the destination address. The time-to-live value of these targeted hello messages may, in some cases, be set to a system default time-to-live value.

As will be described in further detail below, the first routing device may use targeted neighbor connection 24 to process a source-active register message that specifies a source address and an identifier (e.g., a group address) that are collectively associated with a multicast stream provided by at least one source device, and the source-active register message further indicates whether the multicast stream is active or withdrawn. After processing the source-active register message, the first routing device processes, using the targeted neighbor connection with the second routing device, a list-of-receivers register message that specifies an egress routing device and at least the identifier (and, in some cases, the particular source address) associated with the multicast stream, wherein the list-of-receivers register message further indicates whether or not the egress routing device requests receipt of data associated with the multicast stream. The identifier may, in various cases, comprise a group identifier, such as a group address. In particular non-limiting examples, the identifier may comprise a VPN identifier and/or a site identifier associated with, e.g., a particular multicast stream. In various portions of the description below, for purposes of illustration only, it is assumed that the identifier comprises a group address.

For example, central routing device 20 may receive, from ingress routing device 8, a first targeted hello message comprising a first unicast message that is addressed to a unicast address of central routing device 20 (e.g., any anycast address or a primary address of central routing device 20). In response to receiving the first targeted hello message, central routing device 20 sends, to ingress routing device 8, a second targeted hello message to acknowledge receipt of the first targeted hello message. This second targeted hello message comprises a second unicast message that is addressed to a primary unicast address of ingress routing device 8. The exchange of these targeted hello messages establishes targeted neighbor connection 24 between central routing device 20 and ingress routing device 8, where ingress routing device 8 may, in some cases, have the active role, and central routing device 20 may have the passive role. In some examples, targeted neighbor connection 24 may comprise a reliable transport connection (e.g., Transmission Control Protocol (TCP) or Stream Control Transmission (SCTP) protocol connection), as described in RFC 6559, cited above. The reliable transport mechanism, in some cases, can use either TCP or SCTP as the transport protocol. Ingress routing device 8 and central routing device 20 may also periodically "refresh" these targeted hello messages with one another, based on a refresh timer, to verify the continued presence of the targeted neighborship between ingress routing device 8 and central routing device 20, as described in more detail below.

Once targeted neighbor connection 24 has been established, ingress routing device 8 may send one or more source-active register messages for multicast streams to central routing device 20 using targeted neighbor connection 24. As noted above, and as will be described in more detail in reference to FIG. 2, these source-active register messages may include multiple multicast stream data elements that each specify a source address and, e.g., a group address that are collectively associated with a respective multicast stream. These source-active register messages indicate, to central routing device 20, which multicast streams are active with ingress routing device 8 and which streams have been withdrawn.

Once targeted neighbor connection 24 has been established, ingress routing device 8 is capable of sending a given source-active register message to central routing device 20 indicating an entire list of one or more streams that are active with ingress routing device 8, and/or an entire list of one or more streams that are withdrawn from ingress routing device 8. In various examples, all of the various source-active register messages are sent by ingress routing device 8 to central routing device 20 via targeted neighbor connection 24, which may comprise a reliable transport connection using TCP or SCTP (as non-limiting examples) for the transport protocol. Furthermore, in some cases, the reliable transport mechanism of targeted neighbor connection 24 may handle the re-transmission of any source-active register messages from ingress routing device 8 to central routing device 20, if needed (e.g., if any source-active register messages are lost or corrupted during initial transmission from ingress routing device 8).

For example, if a set of multicast streams have become active with ingress routing device 8, ingress routing device 8 sends a source-active register message to central routing device 20 with source and group addresses of these active streams, such that central routing device 20 is able to update its state information for these active streams. The state information maintained by central routing device 20 identifies a respective source address and group address for each active multicast stream. Subsequently, if any of these streams are withdrawn at ingress routing device 8, ingress routing device 8 sends an update source-active register message to central routing device 20 indicating the source and group addresses of the streams that have been withdrawn. Upon receiving this updated message, central routing device 20 updates its state information (e.g., deletes the source and group addresses for the withdrawn streams from the state information). In this way, once targeted neighbor connection 24 is established, ingress routing device 8 is capable of continuously updating central routing device 20 with its existing and active multicast streams, as well as any streams that have been withdrawn.

In a similar fashion as that described above, central routing device 20 may establish a targeted neighbor connection 26 with egress routing device 14. Once targeted neighbor connection 26 has been established, egress routing device 14 may send one or more receiver-active register messages for multicast streams to central routing device 20 using targeted neighbor connection 26, as shown in more detail in FIG. 3. These receiver-active register messages may include multiple multicast stream data elements that each specify at least a group address (and, in some instances, a particular source address or a wildcard source address, as described in more detail below) associated with a respective multicast stream. These receiver-active register messages indicate, to central routing device 20, which multicast streams are of interest to egress routing device 14 and/or which streams are not of interest (e.g., withdrawn from interest).

Once targeted neighbor connection 26 has been established, egress routing device 14 is capable of sending a given receiver-active register message to central routing device 20 indicating an entire list of one or more streams that are of interest to egress routing device 14, and/or an entire list of one or more streams that are not of interest to egress routing device 14. In various examples, all of the various receiver-active register messages are sent by egress routing device 14 to central routing device 20 via targeted neighbor connection 26, which may comprise a reliable transport connection using TCP or SCTP (as non-limiting examples) for the transport protocol. Furthermore, in some cases, the reliable transport mechanism of targeted neighbor connection 26 may handle the re-transmission of any receiver-active register messages from egress routing device 14 to central routing device 20, if needed (e.g., if any receiver-active register messages are lost or corrupted during initial transmission from egress routing device 14).

For example, if egress routing device 14 is interested in receiving multicast stream data from a set of respective multicast streams, egress routing device 8 sends a receiver-active register message to central routing device 20 with source and group addresses for these streams of interest, such that central routing device 20 is able to update its state information. The state information maintained by central routing device 20 identifies a respective source address and group address for each multicast stream of interest to egress routing device. Subsequently, if any of these streams are no longer of interest (e.g., withdrawn from interest) by egress routing device 14, egress routing device 14 sends an update receiver-active register message to central routing device 20 indicating the source and group addresses of the streams that have been withdrawn from interest. Upon receiving this updated message, central routing device 20 updates its state information (e.g., deletes the source and group addresses for these streams from the state information). In this way, once targeted neighbor connection 26 is established, egress routing device 14 is capable of continuously updating central routing device 20 with source and group information associated with streams of interest or non-interest. In some examples, egress routing device 14 may provide a prefix-range of the group for which it is interested (e.g., 225.1/16). In some examples, the source address can be a wildcard (e.g., * 0.0.0.0) to indicate that egress routing device 14 is interested in traffic from any source for the group.

Figure 4:
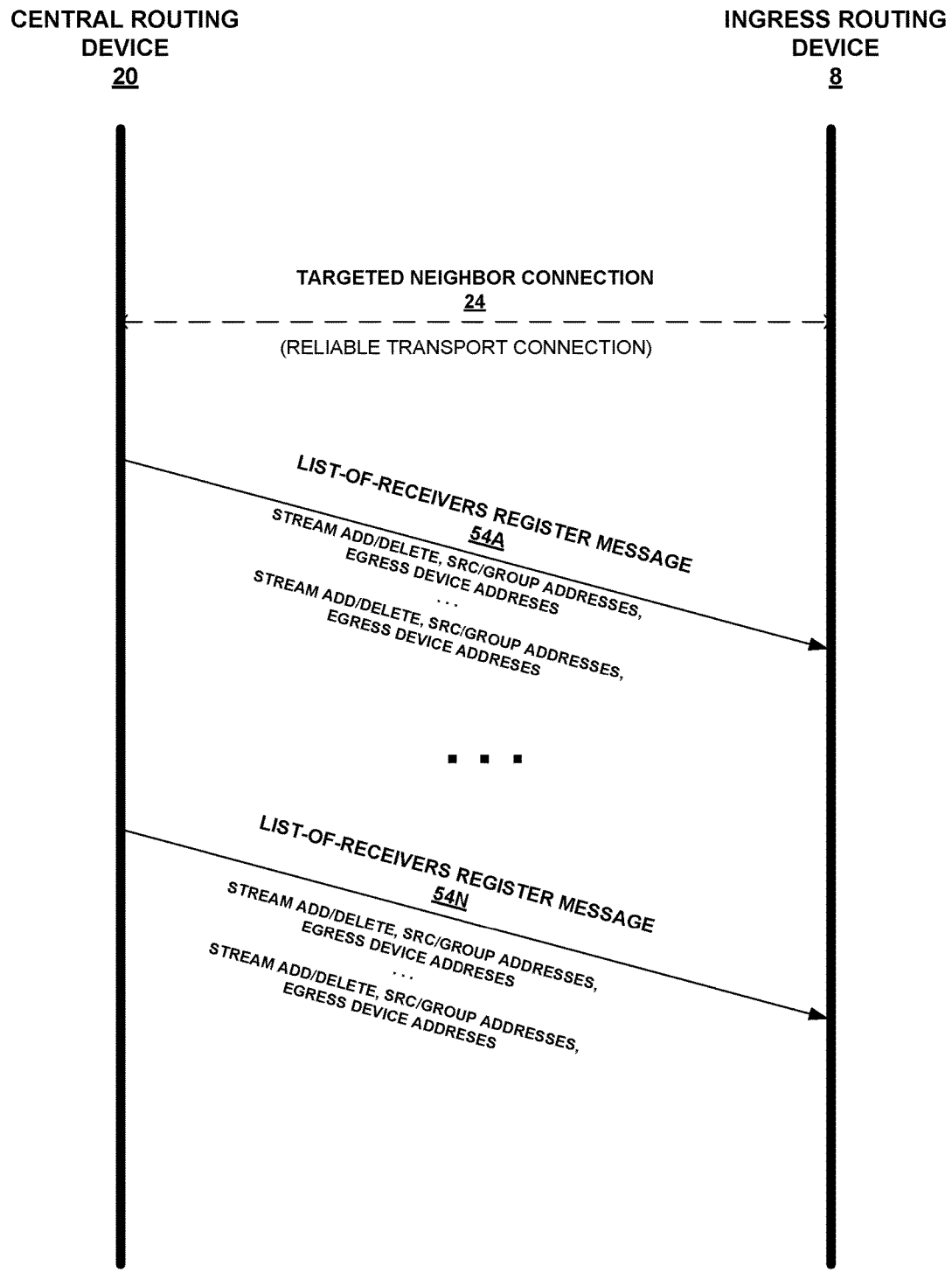
FIG. 4 is a diagram illustrating another example message flow between the central routing device and the ingress routing device illustrated in FIG. 1.

After central routing device 20 has processed any source-active register messages, central routing device 20 may use targeted neighbor connection 24 to send ingress routing device 8 a list-of-receivers register message, as shown in more detail in FIG. 4. For example, if egress routing device 14 previously sent central routing device 20 a receiver-active register message to indicate an interest in a multicast stream associated with a source address and group address (where the source address may comprise a wildcard address indicating interest in "any" source for the group), and if ingress routing device 8 previously sent central routing device 20 a source-active register message for an active stream associated with the source address and group address, central routing device 20 may send ingress routing device 8 a list-of-receivers register message that specified egress routing device 14 along with the source and group associated with the stream. The list-of-receivers register message further indicates that egress routing device 14 has an interest in the multicast stream and requests receipt of data associated with the multicast stream. Once multicast stream data for the stream is available (e.g., provided by source device 2 or 4), ingress routing device 8 may send out multicast data packets to egress routing device 14 in network 1. If network 1 comprises a BIER domain, ingress routing device 8 may form a BIER multicast packet header and forward the data packet over the BIER domain using the shortest path to egress routing device 14, which may forward it to receiver device 6.

As will also be described in further detail below, in some examples, multiple different central routing devices that share a same anycast address may exchange targeted hello messages to establish a full mesh targeted neighbor connections between these central routing devices. In addition, in certain examples, the techniques of the present disclosure allow a FHR (e.g., ingress routing device 8) to discover the primary address of an RP (e.g., central routing device 20) operating in Any-Source Multicast (ASM) mode through the exchange of targeted hello messages.

The implementation of these techniques may, in some cases, provide a hard-state, reliable transport mechanism to supplement or even replace the use of conventional PIM SM register messages, register-stop messages, and/or null-register messages between central routing device 20 and ingress routing device 8, or between central routing device 20 and egress routing device 14. Instead, ingress routing device 8 and egress routing device 14 are each configured to send register messages to central routing device 20 that each include source and group address information for respective multiple multicast streams. The use of such messages may significantly reduce the volume of register messages between ingress routing device 8 and central routing device 20, and also between egress routing device 14 and central routing device 20. Ingress routing device 8 and egress routing device 14 may each take the active role in the communication of such messages, and may send central routing device 20 new register messages in order to provide incremental updates about the status of individual streams (e.g., when certain streams have become active or withdrawn at ingress routing device 38, when certain streams are of interest or withdrawn from interest by egress routing device 14). However, as noted above, each individual register message may include source and group address information for multiple different streams.

With such an approach, in certain examples, the reliable transport mechanism may help minimize packet loss between ingress routing device 8 and central routing device 20 over targeted neighbor connection 24, or between egress routing device 14 and central device 20 over targeted neighbor connection 26. In addition, the techniques of the present disclosure may provide for improved security between these devices using targeted neighbor connections 24 and 26. The reliable transport mechanism may help potentially avoid a flooding or overload of register messages or other information exchanged between these devices.

Figure 2:
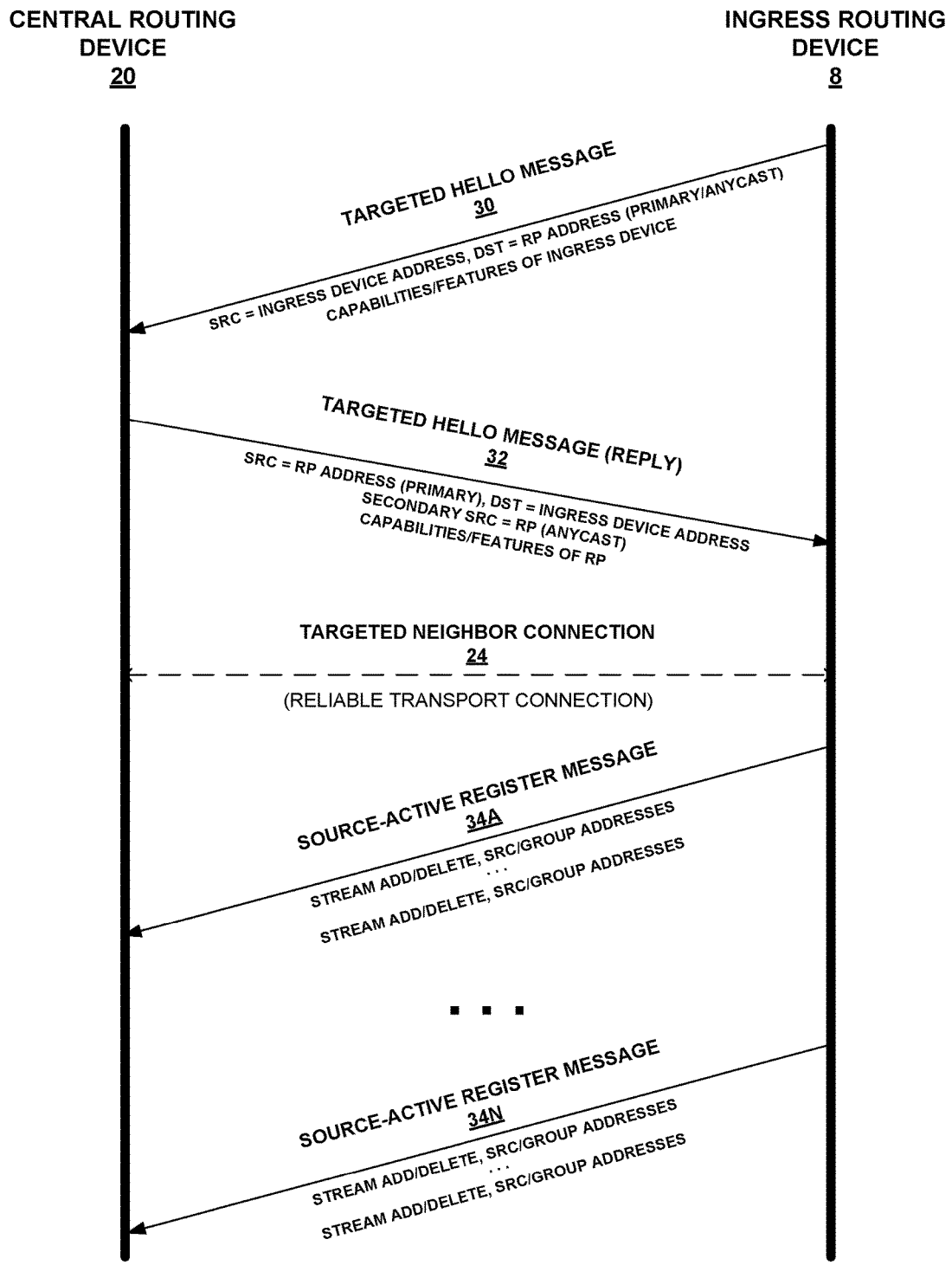
FIG. 2 is a diagram illustrating an example message flow between the central routing device and the ingress routing device illustrated in FIG. 1.

FIG. 2 is a diagram illustrating an example message flow between central routing device 20 and ingress routing device 8 of FIG. 1. FIG. 2 illustrates one non-limiting example of such a message flow. Initially, upon learning of an address of central routing device 20, ingress routing device 8 may send targeted hello message 30 to central routing device 20.

Targeted hello message 30 is a unicast message that is addressed to central routing device 20. The primary source address of targeted hello message 30 is the address of ingress routing device 8, while the destination address, comprising a unicast address, is either the primary or anycast address of central routing device 20. In the example of FIG. 2, central routing device 20 is an RP. In some cases, targeted hello message 30 may further include information regarding one or more capabilities or features of ingress routing device 8. Central routing device 20 may process targeted hello message 30 to discover such capabilities or features and/or negotiate one or more of these capabilities or features with ingress routing device 8.

Upon receiving targeted hello message 30, central routing device 20 may send targeted hello message 32 (reply) to ingress routing device 8 to acknowledge receipt of targeted hello message 30 by central routing device 20. Targeted hello message 32 is a unicast message that is addressed to ingress routing device 8. The primary source address of targeted hello message 32 is the primary address of central routing device 20, while the destination address, comprising a unicast address, is the primary address of ingress routing device 8. In some instances, targeted hello message 32 may have a secondary source address, which may comprise an anycast address serviced by central routing device 20. In some cases, targeted hello message 32 may further include information regarding one or more capabilities or features of central routing device 20. Ingress routing device 8 may process targeted hello message 32 to discover such capabilities or features of central routing device 20 and/or negotiate one or more of these capabilities or features with central routing device 20 based on the capabilities or features supported by ingress routing device 8.

As noted above, if central routing device 20 is configured as an anycast RP and services an anycast address, ingress routing device 8 may initially send targeted hello message 30 with a unicast destination address that is the anycast address of central routing device 20. Upon receiving targeted hello message 32 from central routing device 20, ingress routing device 8 is able to further identify the primary address of central routing device 20, which ingress routing device 8 may use when subsequently sending one or more register messages to central routing device 20. In such fashion, ingress routing device 8 is capable of identifying the primary address of anycast central routing device 20 (e.g., to discover the nearest or current anycast RP that services the anycast address with which ingress routing device 8 may establish a targeted neighbor connection, namely central routing device 20). After ingress routing device 8 and central routing device 20 exchange targeted hello messages 30 and 32, a targeted neighbor connection 24 is established between ingress routing device 8 and central routing device 20, where ingress routing device 8 may, in some cases, have the active role and central routing device 20 may have the passive role in the targeted neighborship. Targeted neighbor connection 24 may comprise a reliable transport connection.

Ingress routing device 8 may maintain neighbor state information (e.g., neighbor state information 108 shown in FIG. 5) that includes information about all of its targeted neighbors. For example, ingress routing device 8 may store the primary address and secondary address (e.g., anycast address) of central routing device 20 in its neighbor state information, as well as any capabilities or features supported by central routing device 20 and/or negotiated between ingress routing device 8 and central routing device 20. Similarly, central routing device 20 may maintain neighbor state information (e.g., neighbor state information 108) that includes information about all of its targeted neighbors. For example, central routing device 20 may store the primary address of ingress routing device 8 in its neighbor state information, as well as any capabilities or features supported by ingress routing device 8 and/or negotiated between ingress routing device 8 and central routing device 20.

Ingress routing device 8 and central routing device 20 may also utilize refresh and hold timers when processing targeted hello messages (e.g., targeted hello message 30 and targeted hello message 32), which may be similar to timers outlined in RFC 4601, cited above. For example, in non-limiting cases, the default refresh time for targeted hello messages may be set to sixty seconds (e.g., 2 times the default link-level hello time outlined in RFC 4601), and the default hold time may be set to two hundred ten seconds (e.g., 3.5 times the default refresh time). In addition, ingress routing device 8 and central routing device 20 may utilize keep-alive messages to check the liveliness of each other and targeted neighbor connection 24. In one example, these keep-alive messages may be similar to those described in RFC 6559, cited above, for reliable connection 24.

Regarding targeted neighbor connection 24, connection loss or reachability loss could occur for one or more of the following reasons: (1) keep-alive message time out; (2) targeted neighbor loss (e.g., expiration of the hold timer for targeted hello messages); and/or (3) close of the connection. Upon detecting any of these conditions, ingress routing device 8 and/or central routing device 20 may close targeted neighbor connection 24 and clear any corresponding state information (e.g., after a grace period), such that ingress routing device 8 and central routing device 20 may subsequently re-establish a new targeted neighbor connection and re-synchronize respective state information (e.g., respective neighbor state information 108 shown in FIG. 5) for the neighborship. As one note, should central routing device 20 and/or ingress routing device 8 request termination of a targeted neighborship, central routing device 20 and/or ingress routing device 8 may send a targeted hello message with a hold time as zero. In addition, if central routing device 20 and/or ingress routing device 8, at a particular point in time, determine that a reconnect or a capability renegotiation with the other device is warranted, central routing device 20 and/or ingress routing device 8 may, in some examples, change the generation identifier (or "GenID," as referred to in RFC 6559 and/or RFC 4601) of the targeted hello messages, in order to reset states and reinitialize the targeted neighbor connection between the two devices. In these examples, a GenID may be included in each of the targeted hello messages exchanged between the two devices.

After targeted neighbor connection 24 is established, ingress routing device 8 may send one or more source-active register messages for multicast streams to central routing device 20 using targeted neighbor connection 24 using the primary address of central routing device 20. As shown in the example of FIG. 2, ingress routing device 8 sends one or source-active messages 34A-34N to central routing device 20. Each of these source-active register messages include multiple multicast stream data elements that each specify a source address and a group address that are collectively associated with a respective multicast stream. Furthermore, these source-active register messages indicate, to central routing device 20, which multicast streams are active with ingress routing device 8 and which streams have been withdrawn. Example formats of a source-active register message and multicast stream data elements are described in more detail below, such as, for example, in reference to FIG. 8A. If a particular stream is active at ingress routing device 8, the corresponding multicast stream data element of the source-active register message may indicate that this particular stream is to be added to the stream state information maintained by central routing device 20 (e.g., stream state information 109 shown in FIG. 5). If, however, a particular stream is withdrawn at ingress routing device 8, the corresponding multicast stream data element of the source-active register message may indicate that this particular stream is to be deleted from the stream state information maintained by central routing device 20.

For example, if a group of multicast streams have become active with ingress routing device 8, ingress routing device 8 sends source-active register message 34A to central routing device 20 with source and group addresses of these active streams, such that central routing device 20 is able to update its stream state information for streams that are active at ingress routing device 8. The stream state information maintained by central routing device 20 identifies a respective source address and group address for each active multicast stream. Subsequently, if any of these streams are withdrawn at ingress routing device 8, ingress routing device 8 may send another source-active register message (e.g., register message 34N) to central routing device 20 indicating the source and group addresses of the streams that have been withdrawn. Upon receiving this updated source-active message, central routing device 20 updates its stream state information (e.g., deletes the source and group addresses for the withdrawn streams). In this way, once targeted neighbor connection 24 is established, ingress routing device 8 is capable of continuously updating central routing device 20 with its existing and active multicast streams, as well as any streams that have been withdrawn.

Based upon the content of register messages 34A-34N sent by ingress routing device 8, central routing device 20 updates its stream state information for active multicast streams. The stream state information identifies a respective source address and group address for each active multicast stream, and may also identify the device from which the source and group address information is received (e.g., ingress routing device 8). As one example, in a given source-active register message 34A-34N received from ingress routing device 8, for each multicast stream that is indicated as active in the multicast stream data elements, central routing device 20 may add the respective source address and group address to its stream state information. On the other hand, for each multicast stream that is indicated as withdrawn in the multicast stream data elements of the given source-active register message, central routing device 20 may remove the respective source address and group address its stream state information.

To provide a non-limiting example of the processing of such source-active register messages 34A-34N, ingress routing device 8 may send central routing device 20 a first source-active register message 34A, via targeted neighbor connection 24, which includes a group of multicast stream data elements. In this example, the group of multicast stream data elements included in source-active register message 34A may be associated with a first group of multicast streams, namely STREAM 1, STREAM 2, and STREAM 3, which are each serviced by ingress routing device 8.

For instance, a first multicast stream data element may specify a first source address S1 and a first group address G1 that are collectively associated with STREAM 1. This first multicast stream data element further indicates that STREAM 1 is active at ingress routing device 8 (e.g., by indicating that S1 and G1 are to be added to the stream state information maintained by central routing device 20 for ingress routing device 8). Similarly, a second multicast stream data element specifies a second source address S2 and a second group address G2 that are collectively associated with STREAM 2, and also indicates that STREAM 2 is active at ingress routing device 8. A third multicast stream data element specifies a third source address S3 and a third group address G3 that are collectively associated with STREAM 3, and also indicates that STREAM 3 is active at ingress routing device 8.

Upon receipt of source-active register message 34A, central routing device 20 may update its stream state information by adding, to the state information and based on the first multicast stream data element in register message 34A, a first entry specifying the first source address S1 and the first group address G1 for STREAM 1. Similarly, central routing device 20 may add, based on the second multicast stream data element, a second entry specifying the second source address S2 and the second group address G2 for STREAM 2, and may add, based on the third multicast stream data element, a third entry specifying the third source address S3 and the third group address G3 for STREAM 3. The first, second, and third entries in the stream state information of central routing device 20 indicate that STREAM 1, STREAM 2, and STREAM 3, respectively, are active at ingress routing device 8. In some examples, the stream state information may include a list of ingress routing devices that are active for particular group and/or group-source combination, and central routing device 20 may update this list upon receipt of source-active register message 34A. In this case, the stream state information may include (or add) three lists of ingress routing devices: one associated with STREAM 1 (S1, G1), one associated with STREAM 2 (S2, G2), and one associated with STREAM 3 (S3, G3). Each of these lists may include an entry for ingress routing device 8, as each of these streams are indicated as active at ingress routing device 8.

However, at a later point in time, if STREAM 1 becomes withdrawn at ingress routing device 8, but a new stream, STREAM 4, becomes active, ingress routing device 8 may send a separate register message 34N to central routing device 20 via targeted neighbor connection 24. Register message 34N includes a group of multicast stream data elements, where a first data element specifies the first source address S1 and the first group address G1 collectively associated with STREAM 1, and further indicates that STREAM 1 is now withdrawn at ingress routing device 8 (e.g., by indicating that S1 and G1 are to be deleted from the stream state information maintained by central routing device 20 for ingress routing device 8). Register message 34N includes a second multicast stream data element that specifies a fourth source address S4 and a fourth group address G4 that are collectively associated with STREAM 4, and also indicates that STREAM 4 is active at ingress routing device 8 (e.g., by indicating that S4 and G4 are to be added to the stream state information maintained by central routing device 20).

Upon receipt of register message 34N, central routing device 20 updates its stream state information by, in some instances, removing, from the state information and based on the first multicast stream data element in register message 34N, the first entry specifying the first source address S1 and the first group address G1 for the STREAM 1. In some cases, however, prior to doing so, central routing device 20 may update the list of ingress routing devices that are active for STREAM 1. In particular, central routing device 20 may delete the entry for ingress routing device 8 in this list, given that STREAM 1 is now withdrawn at ingress routing device 8.

Additionally, central routing device 20 may add, based on the second multicast stream data element in register message 34N, a fourth entry specifying the fourth source address S4 and the fourth group address G4 for STREAM 4, indicating that STREAM 4 is active at ingress routing device 8. Central routing device 20 may also create a new list of ingress routing devices that are active for STREAM 4, and add ingress routing device 8 to this list. In such fashion, ingress routing device 8 is able to update central routing device 20 with its existing, active multicast streams by sending incremental updates to central routing device 20. In response, central routing device 20 is able to update the stream state information for any multicast streams that are active at ingress routing device 8.

Figure 3:
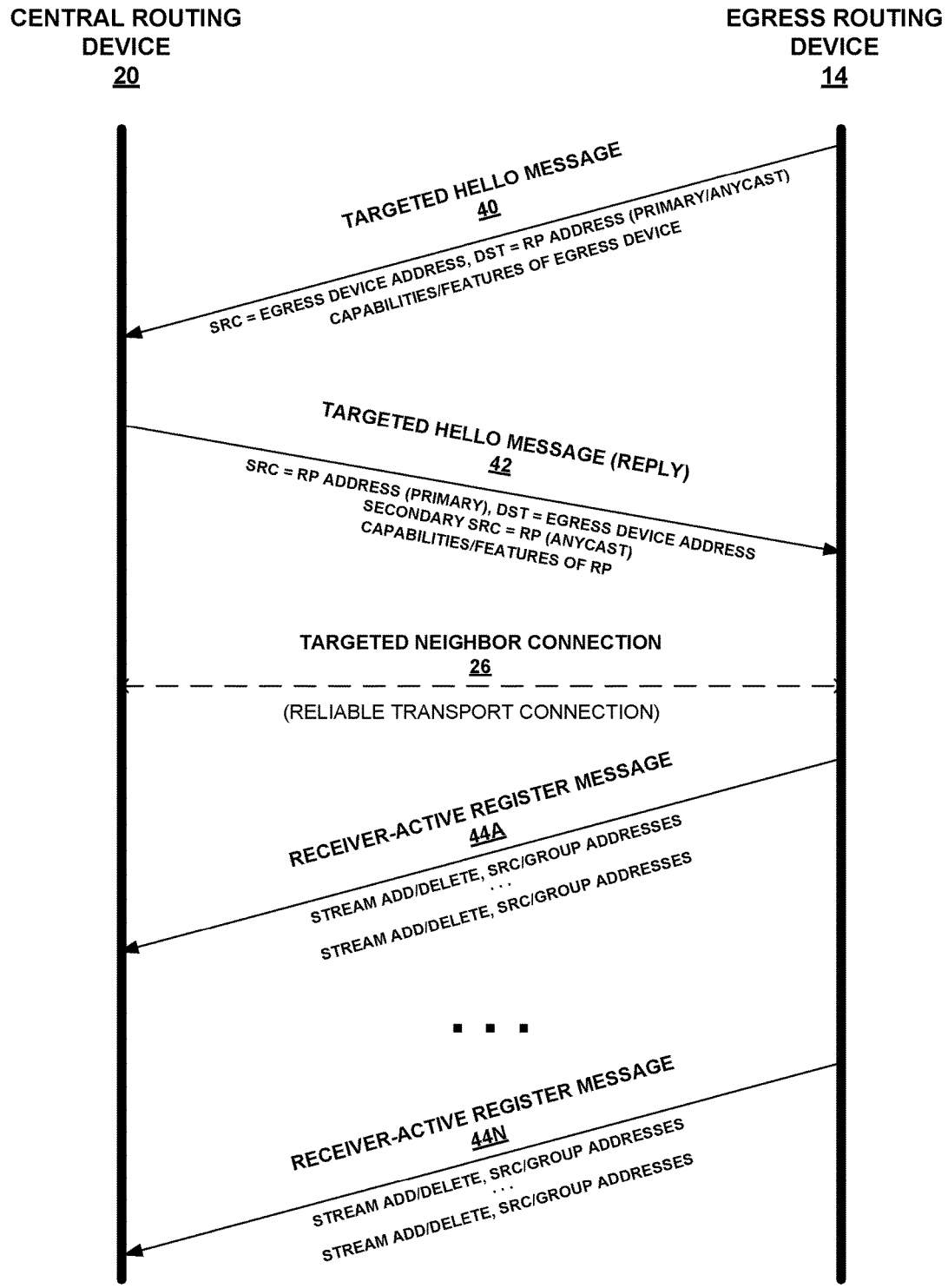
FIG. 3 is a diagram illustrating an example message flow between the central routing device and the egress routing device illustrated in FIG. 1.

FIG. 3 is a diagram illustrating an example message flow between central routing device 20 and egress routing device 14 illustrated in FIG. 1. Similar to the techniques described above in reference to FIG. 2, FIG. 3 illustrates an exchange of targeted hello messages 40 and 42 between central routing device 20 and egress routing device 14 to establish targeted neighbor connection 26 between these devices. Both central routing device 20 and egress routing device 14 may maintain neighbor state information that includes information about each of their respective targeted neighbors. In the example of FIG. 3, central routing device 20 is an RP.

After targeted neighbor connection 26 is established, egress routing device 8 may send one or more receiver-active register messages for multicast streams to central routing device 20 using targeted neighbor connection 26. As shown in the example of FIG. 3, egress routing device 14 sends one or receiver-active messages 44A-44N to central routing device 20. Each of these receiver-active register messages include multiple multicast stream data elements that each identify a source address and a group address associated with a respective multicast stream. In some instances, the source address may comprise a generic, or wildcard, address indicating "any" source that is associated with the specified group address. Furthermore, these receiver-active register messages indicate, to central routing device 20, which multicast streams are of interest to egress routing device 14 and which streams are not of interest (or withdrawn from interest). Example formats of a receiver-active register message and multicast stream data elements are described in more detail below, such as, for example, in reference to FIG. 8A.

If one or more particular streams are of interest to egress routing device 14 (e.g., egress routing device 14 requests receipt of any data associated with these particular streams), the corresponding multicast stream data element of the receiver-active register message may indicate that the one or more particular streams are to be added to the stream state information maintained by central routing device 20 (e.g., stream state information 109 shown in FIG. 5) as streams of interest to egress routing device 14. If, however, one or more particular streams are not of interest to, or withdrawn from interest by, egress routing device 14, the corresponding multicast stream data element of the receiver-active register message may indicate that these one or more particular streams are to be deleted from the stream state information maintained by central routing device 20 as streams that are not of interest to egress routing device 14. In this way, once targeted neighbor connection 26 is established, egress routing device 8 is capable of continuously updating central routing device 20 with respect to streams that are of interest or not of interest to egress routing device 14.

Based upon the content of register messages 44A-44N sent by egress routing device 14, central routing device 20 updates its stream state information for active multicast streams that are of interest to egress routing device 14. The stream state information identifies a respective source address and group address for each active multicast stream, and may also identify the device from which the source and group address information is received (e.g., egress routing device 8). In some examples, egress routing device 14 may provide a prefix-range of the group for which it is interested (e.g., 225.1/16). In some examples, the source address can be a wildcard (e.g., * 0.0.0.0) to indicate that egress routing device 14 is interested in traffic from any source for the group.

As one example, in a given receiver-active register message 44A-44N received from egress routing device 14, for each multicast stream that is indicated as being of interest in the multicast stream data elements, central routing device 20 may add the respective source address and group address for egress routing device 14 to its stream state information. On the other hand, for each multicast stream that is indicated as withdrawn from interest (or not of interest) to egress routing device 14 in the multicast stream data elements of the given receiver-active register message, central routing device 20 may remove the respective source address and group address for egress routing device 14 its stream state information.

To provide a non-limiting example of the processing of such receiver-active register messages 44A-44N, egress routing device 14 may send central routing device 20 a first receiver-active register message 44A, via targeted neighbor connection 26, which includes a group of multicast stream data elements. In this example, the group of multicast stream data elements included in receiver-active register message 44A may be associated with a first group of multicast streams, namely STREAM 1, STREAM 2, and STREAM 3, which are each indicated as being of interest to egress routing device 14 (e.g., egress routing device 14 is interested in receiving multicast stream data from each of these streams).

For instance, a first multicast stream data element may identify a first source address S1 and a first group address G1 that are collectively associated with STREAM 1. This first multicast stream data element further indicates that STREAM 1 is of interest to egress routing device 14 (e.g., by indicating that S1 and G1 are to be added to the stream state information maintained by central routing device 20 for egress routing device 14). Similarly, a second multicast stream data element identifies a second source address S2 and a second group address G2 that are collectively associated with STREAM 2, and also indicates that STREAM 2 is of interest to egress routing device 14. A third multicast stream data element identifies a third source address S3 and a third group address G3 that are collectively associated with STREAM 3, and also indicates that STREAM 3 is of interest to egress routing device 14. In this example, S1, S2, and/or S3 may comprise a specific source address or a wildcard source address indicating any source associated with G1, G2, or G3, respectively.

Upon receipt of receiver-active register message 44A, central routing device 20 may update its stream state information by adding, to the state information and based on the first multicast stream data element in register message 44A, a first entry identifying the first source address S1 and the first group address G1 for STREAM 1. Similarly, central routing device 20 may add, based on the second multicast stream data element, a second entry identifying the second source address S2 and the second group address G2 for STREAM 2, and may add, based on the third multicast stream data element, a third entry identifying the third source address S3 and the third group address G3 for STREAM 3. The first, second, and third entries in the stream state information of central routing device 20 indicate that STREAM 1, STREAM 2, and STREAM 3, respectively, are each of interest to egress routing device 14.

In some examples, the stream state information may include a list of egress routing devices that each have interest in a particular group or source/group, and central routing device 20 may update this list upon receipt of receiver-active register message 44A. In this case, the stream state information may include (or add) three lists of egress routing devices: one associated with STREAM 1 (S1, G1), one associated with STREAM 2 (S2, G2), and one associated with STREAM 3 (S3, G3). Each of these lists may include an entry for egress routing device 14, indicating that egress routing device 14 has an interest in receiving multicast stream data from each of these streams.

However, at a later point in time, if egress routing device 14 withdraws interest in STREAM 1, but expresses interest in a new stream, STREAM 4, egress routing device 14 may send a separate register message 44N to central routing device 20 via targeted neighbor connection 26. Register message 44N includes a group of multicast stream data elements, where a first data element identifies the first source address S1 and the first group address G1 collectively associated with STREAM 1, and further indicates that STREAM 1 is now withdrawn from interest by egress routing device 14 (e.g., by indicating that S1 and G1 are to be deleted from the stream state information maintained by central routing device 20 for egress routing device 14). Register message 44N includes a second multicast stream data element that identifies a fourth source address S4 and a fourth group address G4 that are collectively associated with STREAM 4, and also indicates that STREAM 4 is now of interest to egress routing device 14 (e.g., by indicating that S4 and G4 are to be added to the stream state information maintained by central routing device 20 for egress routing device 14). In this example, S4 may comprise a specific source address or a wildcard source address indicating any source associated with G4.

Upon receipt of register message 44N, central routing device 20 updates its stream state information by, in some instances, removing, from the state information and based on the first multicast stream data element in register message 44N, the first entry identifying the first source address S1 and the first group address G1 for STREAM 1. In some cases, however, prior to doing so, central routing device 20 may update the list of egress routing devices that have interest in STREAM 1. In particular, central routing device 20 may delete the entry for egress routing device 14 in this list, given that egress routing device 14 no longer has an interest in STREAM 1. In some cases, as will be described in further detail below, central routing device 20 may also send a list-of-receivers register message to any ingress routing device for which STREAM 1 is active, to inform any such ingress routing devices that egress routing device 14 is no longer interested in STREAM 1.

Additionally, central routing device 20 may add, based on the second multicast stream data element in register message 44N, a fourth entry identifying the fourth source address S4 and the fourth group address G4 for STREAM 4, indicating that STREAM 4 is of interest to egress routing device 14. Central routing device 20 may also create a new list of egress routing devices that have interest in STREAM 4, and add egress routing device 14 to this list. In some cases, as will be described in further detail below, central routing device 20 may also send a list-of-receivers register message to any ingress routing device for which STREAM 4 is active, to inform any such ingress routing devices that egress routing device 14 is interested in STREAM 4.

In such fashion, egress routing device 14 is able to update central routing device 20 with respect to its multicast streams of interest by sending incremental updates to central routing device 20. In response, central routing device 20 is able to update the stream state information for any multicast streams that are of interest to egress routing device 14.

FIG. 4 is a diagram illustrating another example message flow between central routing device 20 and ingress routing device 8 illustrated in FIG. 1. The example message flow illustrated in FIG. 4 may, in some examples, be a continuation of the example message flow between central routing device 20 and ingress routing device 8 shown in FIG. 2. In the example of FIG. 4, central routing device 20 is an RP.

In FIG. 4, targeted neighbor connection 24 has been established between central routing device 20 and ingress routing device 8. Furthermore, in some examples, it may be assumed that ingress routing device 8 has sent one or more source-active register messages (e.g., source-active register messages 34A-34N shown in FIG. 2) to central routing device 20, and also that egress routing device 14 may have sent one or more receiver-active register messages (e.g., receiver-active register messages 44A-44N shown in FIG. 3) to central routing device 20.

As shown in FIG. 4, central routing device 20 may send ingress routing device 8 one or more list-of-receivers register messages 54A-54N. Each such list-of-receivers register message may indicate whether or not egress routing device 14 is interested in one or more particular multicast streams (and requests receipt of data associated with these streams). A list-of-receivers register message may identify egress routing device 14 (e.g., by address) along with the source address and group address that are collectively associated with the multicast stream. In such fashion, central routing device 20 may send one or more list-of-receivers register messages 54A-54N to inform ingress routing device 8 about the egress routing devices (e.g., egress routing device 14) that have expressed interest in a particular multicast group or source/group. (The source address specified in a list-of-receivers register message may comprise a generic or wildcard address to indicate "any" source associated with the group.)

To provide a non-limiting example of the processing of such list-of-receivers register messages 54A-54N, ingress routing device 8 may have previously sent central routing device 20 a first source-active register message 34A, via targeted neighbor connection 24, which includes a group of multicast stream data elements that may be associated at least with a first multicast stream, namely STREAM 1, which is serviced by ingress routing device 8. For instance, a first multicast stream data element may identify a first source address S1 and a first group address G1 that are collectively associated with STREAM 1. This first multicast stream data element further indicates that STREAM 1 is active at ingress routing device 8. Central routing device 20 may also update, in its stream state information, a list of ingress routing devices that are active for STREAM 1 (S1, G1). This list includes an entry for ingress routing device 8, as STREAM 1 is active at ingress routing device 8.

Egress routing device 14 may have also previously sent central routing device 20 a first receiver-active register message 44A, via targeted neighbor connection 26, which includes a group of multicast stream data elements that may be associated at least with the first multicast stream, namely STREAM 1. For instance, a first multicast stream data element may identify the first source address S1 and the first group address G1 that are collectively associated with STREAM 1. This first multicast stream data element further indicates that STREAM 1 is of interest to egress routing device 14. Central routing device 20 may also update, in its stream state information, a list of egress routing devices that have interest in STREAM 1 (S1, G1). This list includes an entry for egress routing device 14, as STREAM 1 is of interest to egress routing device 14. In this particular example, S1 of first receiver-active register message 44A may comprise a particular source address. In other examples, however, the source address provided in a receiver-active register message comprise a wildcard source address indicating an interest in data from any source for the respective multicast stream.

Accordingly, central routing device 20 may send list-of-receivers register message 54A to ingress routing device 8 that includes first source address S1 and first group address G1, to identify STREAM 1, and also includes the address of egress routing device 14. The list-of-receivers register message 54A may also indicate that egress routing device 14 has an interest in STREAM 1 (e.g., by setting an add/delete flag to "add"). In such fashion, ingress routing device 8 becomes aware that egress routing device 14 has an interest in STREAM 1, and may subsequently send any stream data for STREAM 1 to egress routing device 14, via network 1, using a BIER header that specifies egress routing device 14 as at least one recipient of the stream data. Again, in this example, S1 of list-of-receivers register message 54A may comprise a particular source address, but, in other examples, however, the source address provided in a list-of-receivers register message may comprise a wildcard source address indicating any source for the respective multicast stream.

However, at a later point in time, egress routing device 14 is no longer interested in STREAM 1, it may send another receiver-active register message 44N to central routing device 20. Upon receipt of this receiver-active register message 44N, central routing device 20 may determine which ingress routing devices have STREAM 1 as an active stream. In this particular example, ingress routing device 8 has STREAM 1 as an active stream. As a result, central routing device 20 may send another list-of-receivers register message 54N to ingress routing device 8 to indicate that egress routing device 14 is no longer interested in receiving data for STREAM 1. List-of-receivers register message 54N includes first source address S1 and first group address G1, to identify STREAM 1, and also includes the address of egress routing device 14. List-of-receivers register message 54A may also indicate that egress routing device 14 no longer has an interest in STREAM 1 (e.g., by setting an add/delete flag to "delete"). In such fashion, ingress routing device 8 becomes aware that egress routing device 14 no longer has an interest in STREAM 1.

In general, each list-of-receivers register message 54A-54N may include source/group address information for one or more multicast streams. For each stream, an individual list-of-receivers register message also identifies one or more egress routing devices that have indicated either an interest or no interest (e.g., withdrawn interest) in the respective stream. An add/delete flag for each stream in the list-of-receivers register message may specify whether the respective one or more egress routing devices have an interest (e.g., flag set to "add") or no interest (e.g., flag set to "delete") in the stream. Additionally, the source address for a given stream in the list-of-receivers message can be a wildcard (e.g., * 0.0.0.0) to indicate that the one or more respective egress routing devices are interested in traffic from any source in the group.

Figure 5:
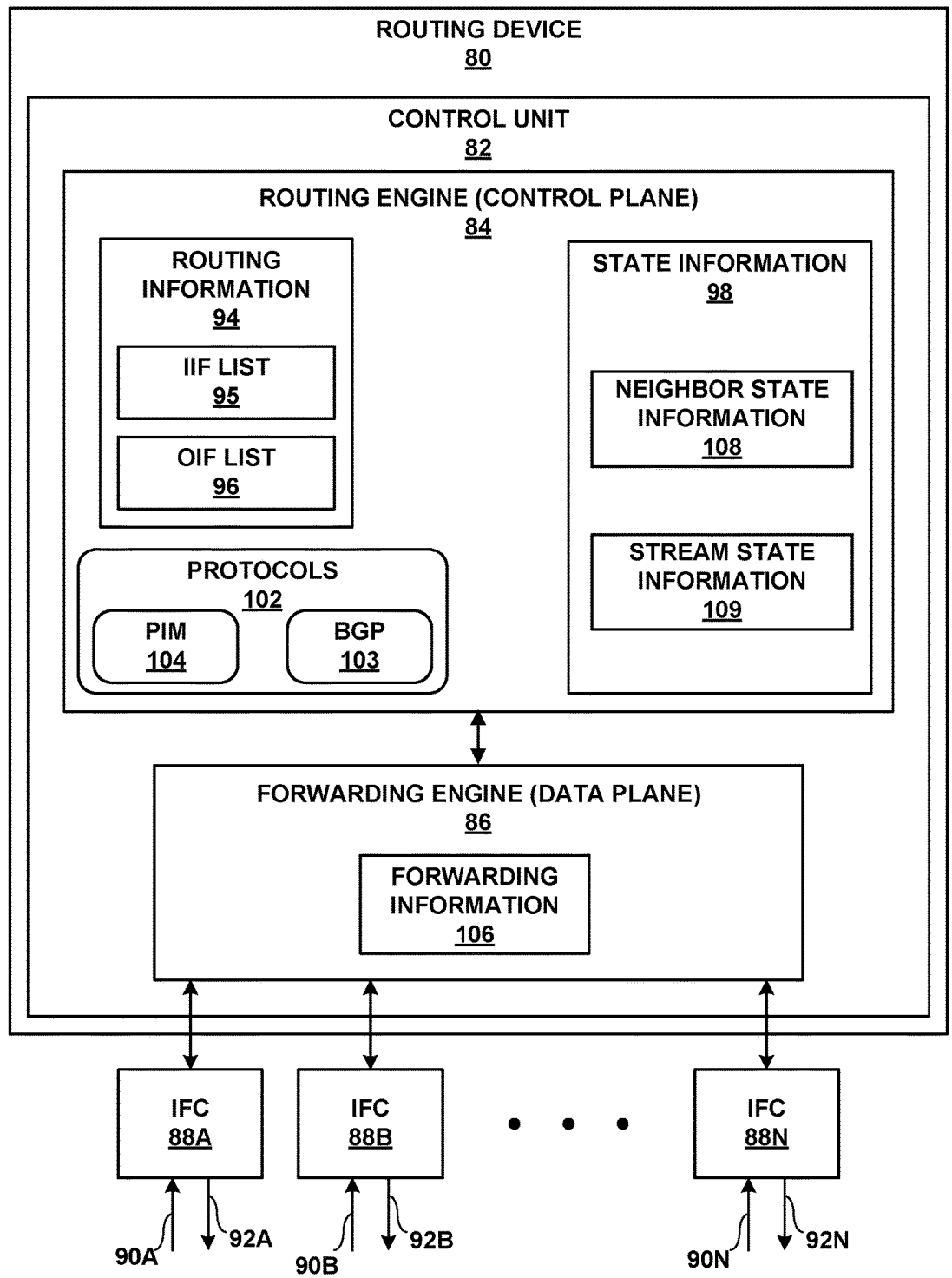
FIG. 5 is a block diagram illustrating an example routing device, such as one of the routing devices shown in FIGS. 1-4.

FIG. 5 is a block diagram illustrating an example routing device 80, such as one of the routing devices shown in FIGS. 1-4. For example, any of routing devices 8, 10, 12, 14, 16, 18, 20, and/or 22 may comprise routing device 80 illustrated in FIG. 5.

In this example, routing device 80 includes interface cards 88A-88N ("IFC's 88") that receive multicast packets via incoming links 90A-90N ("incoming links 90") and send multicast packets via outbound links 92A-92N ("outbound links 92"). IFC's 88 are typically coupled to links 90, 92 via a number of interface ports. Routing device 80 also includes a control unit 82 that determines routes of received packets and forwards the packets accordingly via IFC's 88.

Control unit 82 may comprise a routing engine 84 and a forwarding engine 86. Routing engine 84 operates as the control plane for routing device 80 and includes an operating system that may provide a multi-tasking operating environment for execution of a number of concurrent processes. Routing engine 84 may implement one or more routing protocols 102 to execute routing processes. For example, routing protocols 102 may include Border Gateway Protocol (BGP) 103, for exchanging routing information with other routing devices in a computer network (e.g., network 1) and for updating routing information 94. Routing engine 84 may also implement Interior Gateway Protocol (IGP) protocols, such as link state routing protocols Open Shortest Path First (OSPF) and/or Intermediate System-to-Intermediate System (IS-IS), for exchanging link state information with other routing.

Routing information 94 may describe a topology of the computer network in which routing device 80 resides. Routing information 94 describes various routes within the computer network, and the appropriate next hops for each route, e.g., the neighboring routing devices along each of the routes. In the illustrated example, routing information 94 includes an incoming interface (IIF) list 95 and an outgoing interface (OIF) list 96 that indicates which of IFC's 88 are connected to neighboring routing devices in each route.

In addition, routing protocols 102 may include PIM 104, and specifically PIM SM, for routing multicast traffic through the computer network (e.g., network 1) with other routing devices. Routing engine 84 may also implement PIM 104 to update state information 98. State information 98 may describe a current status of links between routing devices for the network. In some examples, routing engine 84 and/or forwarding engine 86 may be used to implement the routing underlay and/or the BIER layer when network 1 comprises one or more BIER domains/sub-domains, as outlined in the BIER Specification.

Routing engine 84 analyzes stored routing information 94 and state information 98 and generates forwarding information 106 for forwarding engine 86. Forwarding information 106 may, for example, identify specific next hops and corresponding IFC's 88 and physical output ports for output links 92. Forwarding information 106 may be a radix tree programmed into dedicated forwarding chips, a series of tables, a complex database, a link list, a radix tree, a database, a flat file, or various other data structures. In the illustrated example of FIG. 5, forwarding information 106 includes forwarding routes that include specific routes to forward multicast traffic to neighboring routing devices. In general, when routing device 80 receives a multicast packet via one of inbound links 90, control unit 82 determines a next hop for the packet in accordance with forwarding information 106, and forwards the packet according to the next hop.

As shown in FIG. 5, and as described above in reference to FIGS. 2-4, state information 98 also includes neighbor state information 108 and stream state information 109. Routing device 80 may maintain neighbor state information 108 to include information about all of its targeted neighbors and targeted neighbor connections. Routing device 80 may store, in neighbor state information 108, the addresses of targeted neighbors with which it has established targeted neighbor connections, as well as any capability or feature information that is associated with each of such connections. For example, if routing device 80 comprises an ingress routing device (e.g., ingress routing device 8) that has established a targeted neighbor connection (e.g., targeted neighbor connection 24) with an central routing device (e.g., central routing device 20), routing device 80 may store the primary address and any secondary address (e.g., anycast address) of the central routing device (e.g., RP) in neighbor state information 108, as well as any capabilities or features that are supported by the central routing device or that have been negotiated between the two devices. In general, neighbor state information 108 may include any such address and capability/feature information.

State information 98 further includes stream state information 109, which includes information associated with active streams that are serviced by routing device 80 and/or that are of interest to routing device 80 or other routing devices (e.g., egress routing devices). Routing device 80 maintains and updates stream state information 109 in response to receiving register messages (e.g., register messages 34A-34N shown in FIG. 2, register messages 44A-44N shown in FIG. 3, list-of-receivers register message 54A-54N shown in FIG. 4) from another routing device. For example, routing device 80 may receive a source-active register message from a second routing device to indicate that a group of one or more multicast streams have become active at the second routing device. In such an example, routing device 80 may store the source and group addresses associated with each of these active streams in stream state information 109. Stream state information 109 identifies respective source and group addresses for each active multicast stream. In some instances, routing device 80 may also store, in stream state information 109, the address (e.g., primary address) of the second routing device from which it has received the source and group address information.

Subsequently, if any of these streams are withdrawn at the second routing device, routing device 80 may receive another source-active register message from the second routing device specifying the source and group addresses of the streams that have been withdrawn. Upon receiving this updated message, routing device 80 updates its stream state information 109 (e.g., deletes the source and group addresses for the withdrawn streams, and also the address of the second routing device in some cases). In this way, once a targeted neighbor connection is established with routing device 80, routing device 80 is capable of continuously updating its stream state information 109 to add source and group address information for existing and active multicast streams, and to delete source and group address information for any streams that have been withdrawn.

Routing device 80 may, in other examples, receive a receiver-active register message from a second routing device to indicate that a group of one or more multicast streams are of interest to the second routing device. In such an example, routing device 80 may store the source and group addresses associated with each of these streams in stream state information 109. Stream state information 109 identifies respective source and group addresses for each active multicast stream. As noted above, the source address may, in some cases, comprise a wildcard address indicating any source associated with the group. In some instances, routing device 80 may also store, in stream state information 109, the address (e.g., primary address) of the second routing device from which it has received the source and group address information.

Subsequently, if any of these streams are no longer of interest to the second routing device, routing device 80 may receive another receiver-active register message from the second routing device specifying the source and group addresses of the streams that have been withdrawn from interest. Upon receiving this updated message, routing device 80 updates its stream state information 109 (e.g., deletes the source and group addresses for the withdrawn streams). In this way, once a targeted neighbor connection is established with routing device 80, routing device 80 is capable of continuously updating its stream state information 109 to add source and group address information for multicast streams of interest, and to delete source and group address information for any streams that have been withdrawn from interest. Routing device 80 may, upon receiving source-active and/or receiver-active register messages, send a list-of-receivers register message to one or more ingress routing devices to provide updated source and/or group information for streams of interest or streams that have been withdrawn from interest by particular egress routing devices.

In some examples, routing device 80 may either send (e.g., if routing device 80 is a central routing device) or receive (e.g., if routing device 80 is an ingress routing device) a list-of-receivers register message to indicate that a group of one or more multicast streams are of interest or have been withdrawn from interest with respect to the one or more egress routing devices indicated in the register message. In such an example, if routing device 80 is an ingress routing device, routing device 80 may store the source and group addresses associated with each of these streams that are of interest in stream state information 109, and may also store the addresses of the egress routing devices that have interest in these respective streams. As noted above, the source address may, in some cases, comprise a wildcard address indicating an interest (or no interest) in data from any source associated with the group. In this example, routing device 80 is able to build a bitmap based on the list of egress routing devices, form a Bier multicast packet header, and send out multicast data packets using this BIER header to the egress routing devices indicated in the list-of-receivers register message. Thus, any explicit tree-building protocol may not necessarily be required, and intermediate nodes may not need to maintain any per-flow state.

If the list-of-receivers register message indicates that a particular stream is not of interest, or withdrawn from interest, with respect to the indicated egress routing devices, routing device 80 (which may comprise an ingress routing device) updates its stream state information 109 (e.g., deletes the addresses of the egress routing devices that no longer have an interest in the stream(s) indicated in the register message). In this way, once a targeted neighbor connection is established with routing device 80, routing device 80 is capable of continuously updating its stream state information 109 to indicate which egress routing devices have interest in particular multicast streams.

The architecture of routing device 80 illustrated in FIG. 5 is shown for exemplary purposes only. The disclosure is not necessarily limited to this architecture. In other examples, routing device 80 may be configured in a variety of ways. In one example, some of the functionality of control unit 82 may be distributed within IFC's 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors that execute software instructions. In that case, the various software modules of control unit 82 may comprise executable instructions stored on a computer-readable storage medium, such as computer memory or storage device.

Figure 6:
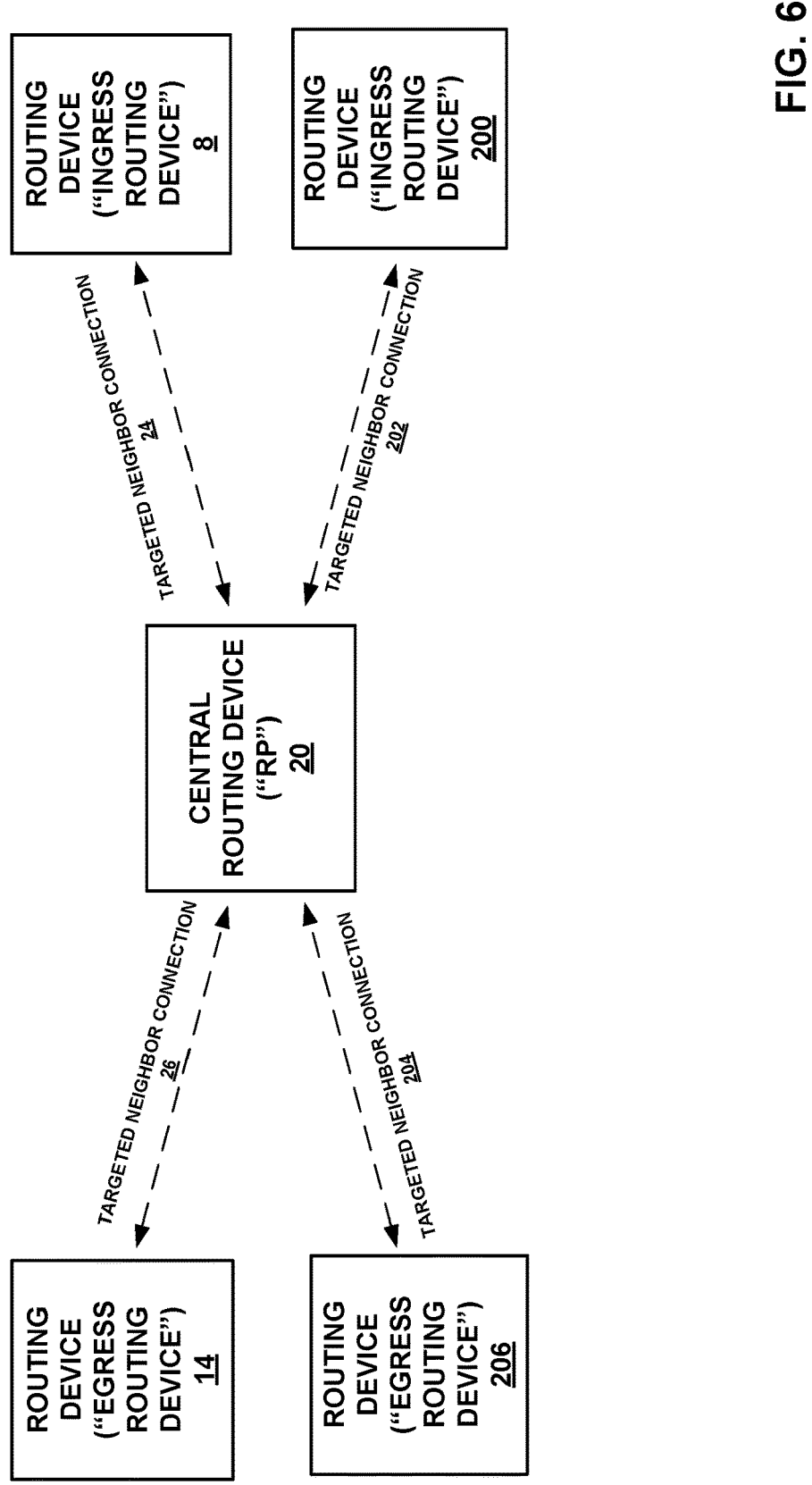
FIG. 6 is a block diagram illustrating an example of respective targeted neighbor connections that are established between a central routing device and multiple different ingress routing devices and egress routing devices.

FIG. 6 is a block diagram illustrating an example of targeted neighbor connections that are established between central routing device 20 and multiple different ingress routing devices 8, 200, and also between central routing device 20 and multiple different egress routing device 14, 206. In general, a central routing device, such as central routing device 20, may establish a respective targeted neighbor connection with one or more ingress routing devices, and may also establish a respective targeted neighbor connection with one or more egress routing devices. Additionally, although not shown in FIG. 6, each central routing device may also be capable of establishing a respective targeted neighbor connection with one or more other central routing devices. In particular, in some examples, central routing devices (e.g., RP's) may form targeted neighborships with each other if these central routing devices service the same anycast address, or if these central routing devices also act as FHR's for different multicast sources. In the examples of FIG. 6, each of the illustrated targeted neighbor connections may comprise a reliable transport connection.

Referring to FIG. 6, central routing device 20 establishes a targeted neighbor connection 24 with ingress routing device 8 in a manner such as that described previously. Similarly, central routing device establishes a targeted neighbor connection 202 with ingress routing device 200. Each of central routing device 20, ingress routing device 8, and ingress routing device 200 may store neighbor state information (e.g., neighbor state information 108 shown in FIG. 5) associated with its respective targeted neighbors and targeted neighbor connections.

Additionally, central routing device 20 establishes a targeted neighbor connection 26 with egress routing device 14 in a manner such as that described previously. Similarly, central routing device establishes a targeted neighbor connection 204 with egress routing device 206. Each of central routing device 20, egress routing device 14, and egress routing device 206 may store neighbor state information (e.g., neighbor state information 108 shown in FIG. 5) associated with its respective targeted neighbors and targeted neighbor connections.

In addition, although not shown central routing device 20 may establish a separate targeted neighbor connection with another, separate central routing device. To do so, central routing device 20 and the other central routing device may exchange targeted hello messages and store state information about this targeted neighbor connection, including the respective primary addresses of central routing device 20 or the other central routing device and potentially any capabilities/features that are associated with targeted neighbor connection 202.

Furthermore, these central routing devices may also support PIM ASM and each serve the same anycast address. In general, a central routing device (e.g., RP) that serves an anycast address may be configured to store the primary addresses of other central routing devices serving the same anycast address, and these central routing devices may collectively form a full mesh of targeted neighborships. Thus, if both central routing device 20 and another central routing device serve the same anycast address, central routing device 20 stores the primary address of the other central routing device, and the other central routing device stores the primary address of central routing device 20.

In certain examples, the techniques of the present disclosure allow any of routing devices 8, 200, 14, or 206 to discover the primary address of central routing device 20 and/or another central routing device through the exchange of targeted hello messages and establishment of respective targeted neighbor connection. The anycast address and the primary address of central routing device 20 and/or other central routing device may be stored in neighbor state information 108 (FIG. 5). As a result, at any point in time, any of routing device 8, 200, 14, or 206 may be able to discover the primary address of the nearest or current anycast central routing device (e.g., primary address of central routing device 20 or other central routing device), which services a given anycast address, through the exchange of targeted hello messages.

If both central routing device 20 and another central routing device are configured as anycast RP's sharing the same anycast address, central routing device 20 may also transmit, to the other central routing device, any register messages it receives from one or more of routing devices 8, 200, 14, or 206. Thus, central routing device 20 may use its targeted neighbor connection with another central routing device as a portion of a full mesh of targeted neighbor connections among central routing devices sharing the same anycast address to maintain stream state information about multicast streams, and these central routing devices may exchange register messages that are received from individual routing devices, such as routing device 8, 200, 14, or 206. In addition, these routing devices may transition from a first central routing device (e.g., central routing device 20) to another central routing device sharing the same anycast address in the case of a failover or other issue, and may continue sending register messages to this second central routing device such that processing of multicast traffic may continue.

FIG. 7 is a conceptual diagram illustrating an example representation of a targeted hello message. In some examples, the representation of a targeted hello message may be referred to as a type-length-value, or TLV, representation. The various targeted hello messages discussed throughout this disclosure, including the targeted hello messages shown in FIGS. 2-3, may have the format shown in FIG. 7. As noted previously, targeted hello messages have a unicast address as the destination address, and they traverse multiple hops using unicast routing to reach a targeted hello neighbor identified by the destination address.

As shown in the example of FIG. 7, a targeted hello message may include fields 300, 302, 304, 306, 308, and 310. Field 300 has a value that specifies the message type for a targeted hello message (e.g., value of thirty six for a targeted hello message type). Field 302 has a value that specifies the combined byte length of fields 304, 306, 308, and 310 (e.g., value of four bytes). In non-limiting examples, each of fields 300 and 302 are two bytes in length.

Field 304 has a value specifying whether the sender of the targeted hello message requests having the role of a FHR/ingress routing device in the targeted neighborhood. In one example, field 304 is one bit in length and has a value of one (e.g., sender requests having role of a FHR/ingress routing device) or zero (e.g., sender does not request having role of a FHR/ingress routing device).

Field 306 has a value specifying whether the sender of the targeted hello message is a device that is capable of taking the role of a central routing device/RP in the targeted neighborhood as per current states. In one example, field 306 is one bit in length and has a value of one (e.g., sender is capable of having role of a central routing device/RP) or zero (e.g., sender is not capable of having role of an central routing device/RP). If a particular central routing device/RP serves an anycast RP address, this central routing device/RP should, in some examples, set the value of field 306 to one.

Field 308 may comprise a reserved field that is set to zero on transmission and ignored on receipt. In one example, field 308 is twenty six bits in length.

Finally, field 310 may be provided for certain (e.g., experimental) uses, such as signaling experimental capabilities or features. For example, if a sender supports a particular capability or feature, it may set the value of field 310 accordingly. The routing devices that exchange targeted hello messages may use the information in field 310 of such messages to discover and/or negotiate one or more capabilities/features when establishing the targeted neighbor connection. In one example, field 310 is four bits in length.

Figure 8A:
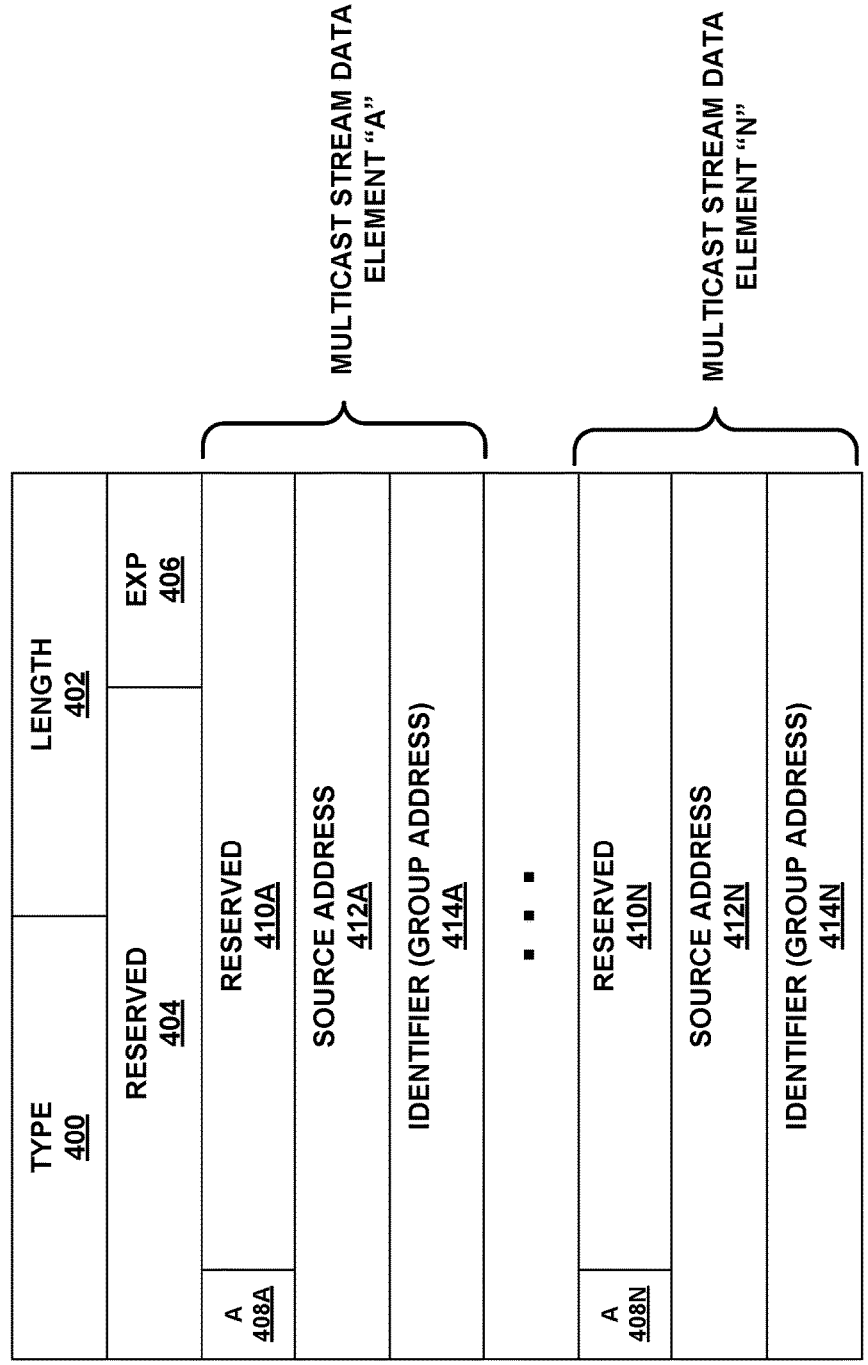
FIGS. 8A-8C are conceptual diagrams illustrating example representations of a register message.

FIG. 8A is a conceptual diagram illustrating an example representation of a register message. In some examples, the representation of a register message may be referred to as a type-length-value, or TLV, representation. The various register messages discussed throughout this disclosure, including register messages 34A-34N shown in FIG. 2 and register messages 44A-44N shown in FIG. 3, may have the format shown in FIG. 8A.

As shown in the example of FIG. 8A, a register message may include fields 400, 402, 404, 406, 408A-408N, 410A-410N, 412A-412N, and 414A-414N. Field 400 has a value that specifies the message type (e.g., value of three for IPv4 multicast streams, value of four for IPV6 multicast streams). Field 402 has a value that specifies the collective byte length of fields 404, 406, 408A-408N, 410A-410N, 412A-412N, and 414A-414N. In non-limiting examples, each of fields 400 and 402 are two bytes in length.

Field 404 is a reserved field having a value that may, in some cases, merely be set to zero on transmission and ignored on receipt. In certain cases, however, the value of field 404 may be associated with properties that apply to the entire message. Field 406 may also be reserved for experimental use. In non-limiting examples, field 404 is twenty eight bits in length and field 406 is four bits in length.

As discussed previously, each register message may include a plurality of multicast stream data elements. For instance, in the example of FIG. 8A, the values of fields 408A, 410A, 412A, and 414A may be associated with multicast stream data element "A," and the values of fields 408N, 410N, 412N, and 414N may be associated with multicast stream data element "N." Multicast stream data element "A" is associated with a particular multicast stream "A," and multicast stream element "N" is associated with a particular multicast stream "N."

Field 410A is a reserved field having a value that may, in some cases, merely be set to zero on transmission and ignored on receipt. In certain cases, however, the value of field 410A may be associated with properties that apply to multicast stream "A" and/or the source and group address included in multicast stream data element "A." In non-limiting examples, field 410A is thirty one bits in length.

Field 408A designates whether source address 412A and identifier 414A is to be added or deleted. In general, field 414A may include any identifier, but in the following description, it is assumed that field 414A includes a group address. In one example, field 408A is one bit in length that has a value of one (e.g., add) or zero (e.g., delete). When an ingress routing device sets the value of field 408A to indicate that source address 412A and group address 414A are to be added, the ingress routing device has identified multicast stream "A" to be an active stream at the ingress routing device, such that the central routing device may add the stream state information (e.g., source address 412A and group address 414A) for this stream. On the other hand, if the value of field 408A indicates that source address 412A and group address 414A are to be deleted, the ingress routing device has identified multicast stream "A" to be withdrawn at the ingress routing device, such that the central routing device may delete the stream state information (e.g., source address 412A and group address 414A) for this stream.

Field 412A specifies the source address associated with multicast stream "A." In non-limiting examples, field 412A has a byte length of four and a value corresponding to a source address of an IPv4 stream without any encoding, while in other examples, field 412A has a byte length of sixteen and a value corresponding to a source address of an IPv6 stream without any encoding.

Field 414A specifies the group address associated with multicast stream "A." In non-limiting examples, field 414A has a byte length of four and a value corresponding to a group address of an IPv4 stream without any encoding, while in other examples, field 414A has a byte length of sixteen and a value corresponding to a group address of an IPv6 stream without any encoding.

Fields 408N, 410N, 412N, and 414N are similar to fields 408A, 410A, 412A, and 414A but correspond instead to multicast stream data element "N." Any number of multicast stream data elements may be included within a given register message, and each particular multicast stream data element is associated with a respective multicast stream that is either active (e.g., to be added) or withdrawn (e.g., to be deleted).

As noted above, in some cases, the format shown in FIG. 8A may be used for receiver-active register messages, such as those shown in FIG. 3. In these cases, in some instances, the register message TLV shown in FIG. 8A may also include a field for the address or other identifier for the egress routing device/last hop router. In some cases, the format shown in FIG. 8A may be expanded and/or modified for use with list-of-receiver register messages. For example, the format may be expanded to include a list of one or more addresses or identifiers of egress routing devices for inclusion in the list-of-receiver register messages.

In other examples, message/packet formats in addition to or in lieu of the format illustrated in FIG. 8A may be utilized, such as for receiver-active, source-active, and/or list-of-receivers register messages. Certain non-limiting examples are described below. In one or more of these non-limiting examples, it is assumed that certain messages include one or more group addresses, although, in various other examples, these group addresses may be replaced by one or more generic identifiers, such as one or more generic group identifiers.

Figure 8B:
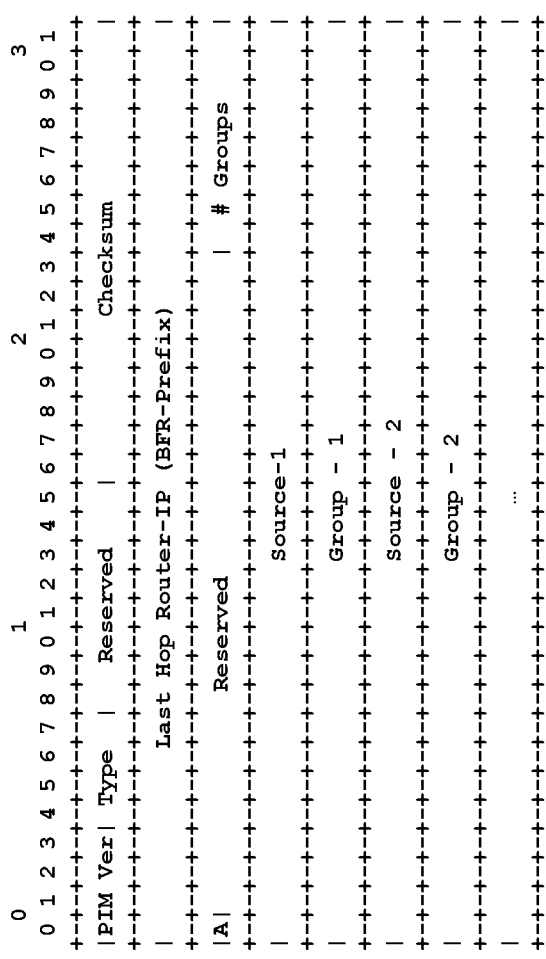

In some examples, for receiver-active register messages, the packet format shown in FIG. 8B may also be used.

In this example, bits zero through 31 are shown at the top of the packet format, and each illustrated row of the format may comprise 32 bits. The PIM version and type may be specified in the indicated fields, where the PIM type may have a value indicating that the message is a receiver-active register message. As shown above, the example packet format may include a field for the address of the last hop router (egress routing device) for the device that has sent the receiver-active message, which is shown as "Last Hop Router-IP (BFR-Prefix)", where the "BFR-Prefix" comprises a prefix for the bit forwarding router that may be used in BIER implementations.

The example packet format for receiver-active register messages may specify the number of groups that are included in the message, and also specifies the source and group addresses for each multicast stream represented in the message. The "A" bit or flag indicates whether one or more streams associated with a group or source/group combination are to be added or withdrawn. If, for example, a particular egress routing device that sends the receiver-active register message is interested in a particular stream, it may set the "A" bit to 1 (e.g., add). If, however, the egress routing device is not interested in the stream, it may set the "A" bit to 0 (e.g., withdraw). The value of the "A" bit may apply to an individual stream, in which case each stream in the receiver-active message has its own separate and distinct "A" bit value, or the value of the "A" bit may, in some cases, apply to all streams represented in the message.

Each stream of the receiver-active message may be represented by a source/group address combination, and the "# Groups" field may indicate the number of streams represented in the message. However, the source address can be a wildcard address (e.g., * 0.0.0.0) to indicate that the egress routing device that has sent the receiver-active message is interested (or not interested) in traffic from any source of the indicated group. Furthermore, for any individual group address, the egress routing device may provide a prefix-range of the group for which it is interested (e.g., 225.1/16).

Figure 8C:
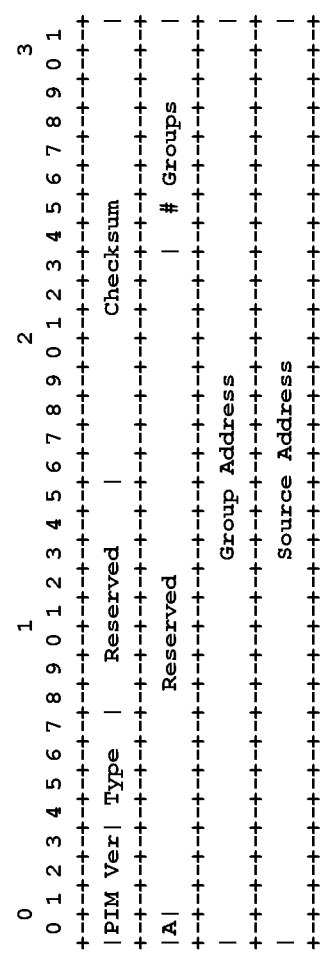

In some examples, for source-active register messages, the packet format shown in FIG. 8C may also be used.

In this example, bits zero through 31 are shown at the top of the packet format, and each illustrated row of the format may comprise 32 bits. The PIM version and type may be specified in the indicated fields, where the PIM type may have a value indicating that the message is a source-active register message.

The example packet format for source-active register messages may specify the number of groups that are included in the message, and also specifies the source and group addresses for each multicast stream represented in the message. The "A" bit or flag indicates whether one or more streams associated with a group or source/group combination are to be added or withdrawn. If, for example, a particular stream is active at an ingress routing device, the ingress routing device that sends the source-active message may set the "A" bit to 1 (e.g., add). If, however, the stream has been withdrawn at the ingress routing device, the ingress routing device may set the "A" bit to 0 (e.g., withdraw). The value of the "A" bit may apply to an individual stream, in which case each stream in the source-active message has its own separate and distinct "A" bit value, or the value of the "A" bit may, in some cases, apply to all streams represented in the message. Each stream of the source-active message may be represented by a source/group address combination, and the "# Groups" field may indicate the number of streams represented in the message. Thus, although the example packet format shown above for source-active register messages illustrates only one group/source address pair for a particular stream, any number of group/source address pairs may be included, and the "# Groups" field may indicate the number of pairs (e.g., streams).

FIG. 9 is a conceptual diagram illustrating another example representation of a register message. In some examples, list-of-receivers register messages, such as list-of-receivers register messages 54A-54N shown in FIG. 4, may have the packet format illustrated in FIG. 9.

As shown in the example of FIG. 9, a list-of-receivers register message may include fields 430, 432, 434, 436, 438, 440, 442, 444, 446, and 450A-450N. In non-limiting examples, field 430 is four bits in length, field 432 is four bits in length, field 434 is eight bits in length, field 436 is sixteen bits in length, field 438 is one bit in length, field 440 is twenty three bits in length, field 442 is eight bits in length, and each of fields 444, 446, and 450A-450N are thirty two bits in length.

Field 430 has a value that specifies the PIM version, and field 432 has a value that specifies the message type. The message type may indicate that the message is a list-of-receivers register message type. Each of fields 434 and 440 may be reserved fields, and field 436 is a checksum field.

Field 438 designates whether one or more streams associated with a group or source/group combination are to be added or withdrawn. If, for example, a particular stream is of interest to the egress routing devices specified in the message for that stream, the "A" bit in field 438 may be set to 1 (e.g., add). If, however, the stream is not of interest to, or has been withdrawn from interest by, the corresponding egress routing devices specified in the message for that stream, the "A" bit in field 438 may be set to 0 (e.g., withdraw).

The example packet format for list-of-receivers register messages illustrated in FIG. 9 may specify the number of groups that are included in the message in field 442, and may also specify the source and group addresses for each multicast stream represented in the message. In addition, for each multicast stream represented in the message, the addresses of one or more egress routing devices are also provided, where these egress routing devices either have interest or have no interest in the respective stream. In the example of FIG. 9, field 442 may indicate that there is one group and associated stream, where field 444 specifies the identifier (e.g., group address) and field 446 specifies the source address for this respective stream. Fields 450A-450N specify the addresses of the one or more egress routing devices that have either expressed interest or no interest in this respective stream.

However, in other examples where field 442 indicates that there are multiple groups for multiple respective streams, the packet format illustrated in FIG. 9 may be expanded to include multiple group/source address pairs, similar to the pair of fields 444 and 446. In addition, for each group/source address pair, the packet format may include fields similar to fields 450A-450N to specify the addresses of the one or more egress routing devices that have either expressed interest or no interest in each respective stream (e.g., in each respective group/source address pair). In these examples, the value of the "A" in for field 438 may apply to all streams represented in the message. However, in some alternate examples, each respective stream may have an associated "A" bit value, in which case a field similar to field 438 may be included in the message format of FIG. 9 for each group/source address pair, to indicate whether each respective stream is of interest or of no interest to the corresponding egress routing devices specified for each group/source address pair.

In some examples, a source address included in the packet format illustrated in FIG. 9 (e.g., source address 446) can be a wildcard address (e.g., * 0.0.0.0) to indicate that the one or more egress routing devices, which specified in the list-of-receivers message for a given stream, are interested (or not interested) in traffic from any source of the indicated group (e.g., group associated with group address specified in field 444). In general, for the various different example packet formats described above and/or shown in FIGS. 8A-8C and/or FIG. 9, fields for a "source address" are included in the respective packet formats. This "source address" may comprise a particular address associated with a particular source, or, as noted above, in some cases, the source address can be a wildcard address, or could even be set to a predefined value, to indicate "any source" that is associated with the specified group.

Multicast flow overlay may, in some cases, become a bit involved because ingress routing devices and egress routing devices may come online at different times. For example, if new ingress routing devices and/or egress routing devices come up online after hello messages have been exchanged and multicast forwarding is set up (e.g., based on a BIER architecture), a central routing device (e.g., central routing device 20) may specifically update new information that is provided to these new ingress routing devices. To address such situations, the central routing device may implement certain procedures that can be used to effectively manage the information and also keep the states up to date.

In certain examples, a central routing device (e.g., an RP, as further described in the examples below) may maintain a database (e.g., an RP-dB) to track the groups, the ingress routing devices that are active for the particular groups and the egress routing devices that have expressed interest for the particular groups. In this way, the RP can track the states and update the ingress routing devices accordingly with the latest information. For instance, the RP-dB may include or be included in state information 98 (e.g., stream state information 109) shown in FIG. 5.

Figure 10:
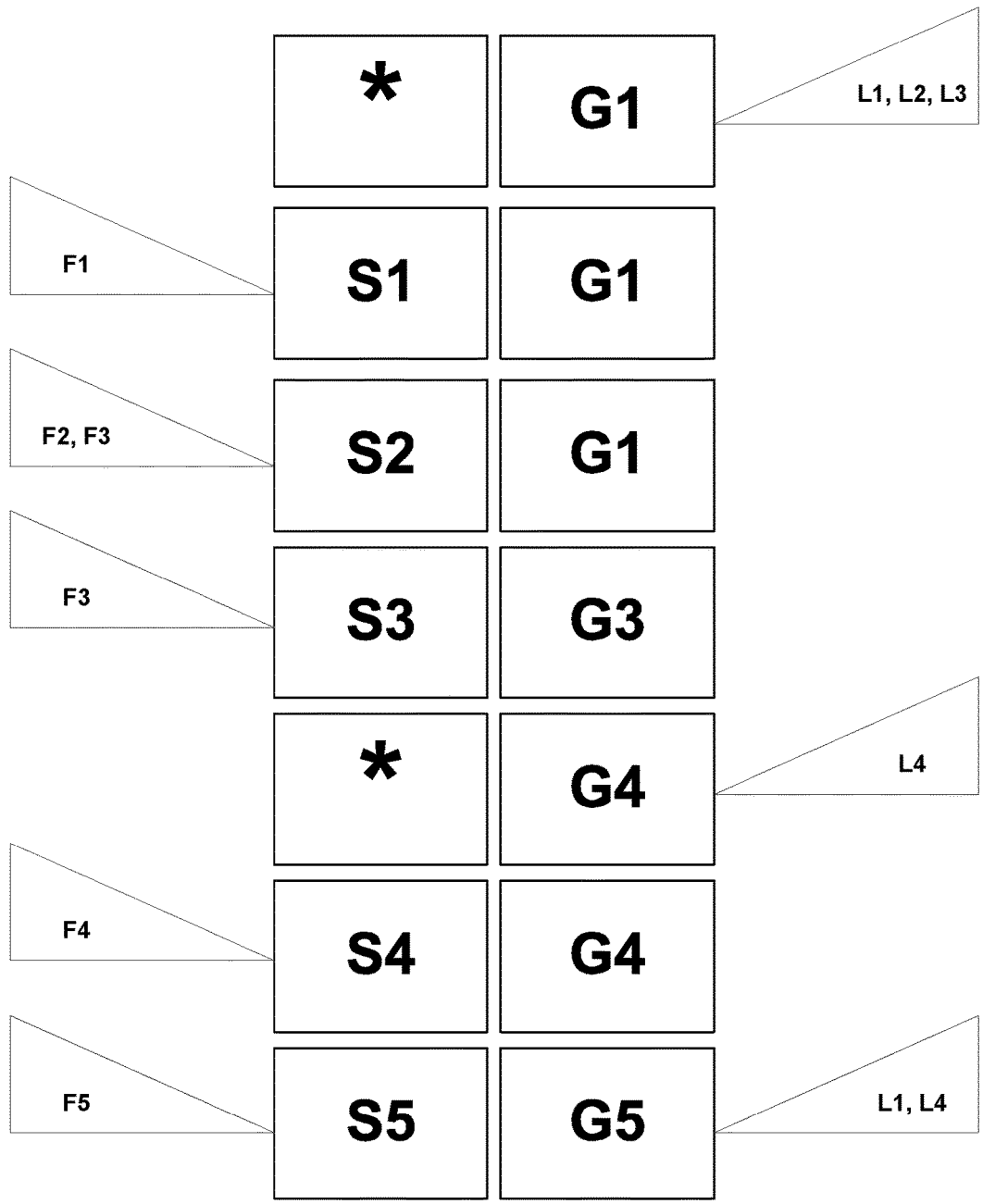
FIG. 10 is a conceptual diagram illustrating example associations between ingress routing devices and active multicast streams, as well as example associations between egress routing devices and multicast streams that are of interest.
Figure 11:
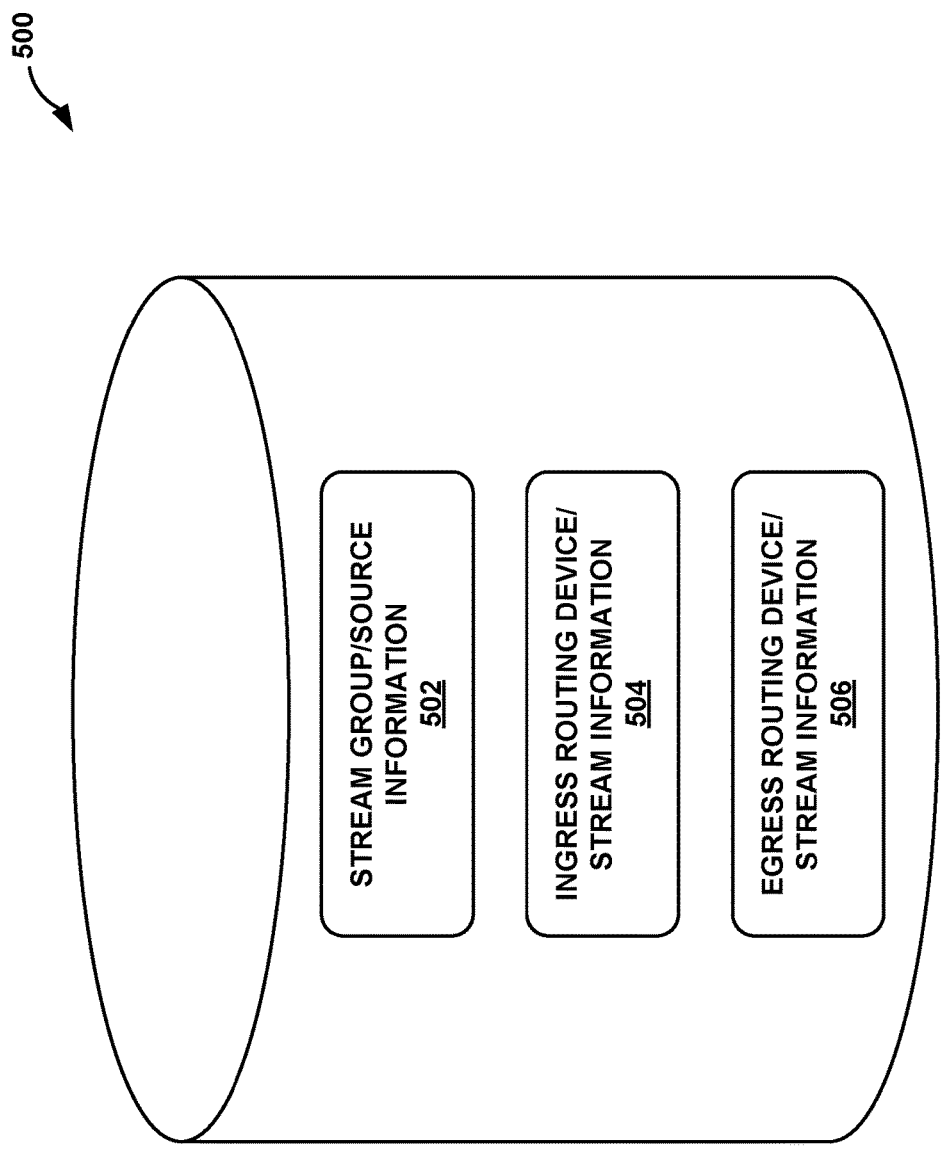
FIG. 11 is a block diagram illustrating an example database that stores information associated with multicast streams.

FIG. 10 is a conceptual diagram illustrating example associations between ingress routing devices and active multicast streams, as well as example associations between egress routing devices and multicast streams that are of interest. The association information illustrated in FIG. 10 may be stored in the RP-dB. FIG. 11 is a block diagram illustrating an example database 500 (e.g., RP-dB) that stores information associated with multicast streams, such as, for instance, the information illustrated in FIG. 10. The association information illustrated in FIG. 10 and/or database 500 illustrated in FIG. 11 may include or be included in state information 98 (e.g., stream state information 109) shown in FIG. 5.

As shown in the example of FIG. 10, various different ingress routing devices (e.g., first hop routers) have active multicast streams. In this example, the ingress routing devices are represented as F1, F2, F3, F4, and F5. Various different egress routing devices (e.g., last hop routers) have expressed interest in certain multicast streams. The egress routing devices are represented as L1, L2, L3, and L4. The different groups or source/groups are represented in FIGS. 10 as (*, G1), (S1, G1), (S2, G1), (S3, G3), (*, G4), (S4, G4), and (S5, G5).

In FIG. 10, the multicast stream associated with (S1, G1) is active with F1, and F1 is sending traffic for this stream. Similarly, F2 and F3 are each sending traffic for the stream associated with (S2, G1), as this stream is active at F2 and F3. F3 is also sending traffic for the stream associated with (S3, G3). F4 is sending traffic for the stream associated with (S4, G4), and F5 is sending traffic for the stream associated with (S5, G5).

As also illustrated in FIG. 10, L1, L2, and L3 are each interested in, and listening for data for, any multicast stream data associated with G1. L4 is interested in any multicast stream data associated with G4. L1 and L4 are each interested in multicast stream data associated with (S5, G5).

As one example, the group or source/group information associated with each of the multicast streams illustrated in FIG. 10, namely (*, G1), (S1, G1), (S2, G1), (S3, G3), (*, G4), (S4, G4), and (S5, G5)), may be included in stream group/source information 502 of database 500, as illustrated in FIG. 11. Ingress routing device/stream information 504 includes, for each group or source/group, a list of those ingress routing devices that are sending traffic for that respective group or source/group. Egress routing device/stream information 506 includes, for each group or source/group, a list of those egress routing devices that have expressed interested in that respective group or source/group.

Thus, based on the example illustrated in FIG. 10, information 504 may comprise the following lists: (1) a first list that includes F1 (e.g., the address of F1) for (S1, G1); (2) a second list that includes F2 and F3 for (S2, G1); (3) a third list that includes F3 for (S3, G3); (4) a fourth list that includes F4 for (S4, G4); and (5) a fifth list that includes F5 (S5, G5). Information 506 may comprise the following lists: (1) a first list that includes L1, L2, and L3 for (*, G1); (2) a second list that includes L4 for (*, G4); and (3) a third list that includes L1 and L4 for (S5, G5).

There are various different triggers that can occur at the RP that may cause the RP to take corresponding actions to attempt to ensure that the states are in sync. In the example description below, the different triggers are represented at T1, T2, T3, and T4, and the actions taken by the RP in response to these triggers are represented as A1, A2, A3, A4, A5, A6, A7, A8, A9, and A10.

In the non-limiting described example below, the different triggers T1, T2, T3, and T4 are generically defined as shown in Table 1 below:

TABLE 1

| TRIGGER | DEFINITION |
|---|---|
| T1 | (RA-*/S, G) Receiver-Active Register Message for group (*/S, G) from Egress L - ADD (e.g., egress routing device L expresses interest in (*/S, G)) |
| T2 | (S, G) Source-Active Register Message for (S, G) from Ingress F - ADD (e.g., (S, G) is active at ingress routing device F); |
| T3 | (RA-*/S, G) Receiver-Active Register Message for group (*/S, G) from Egress L - WITHDRAW (e.g., egress routing device L withdraws interest in (*/S, G)) |
| T4 | (S, G) Source-Active Register Message for (S, G) from Ingress F - WITHDRAW (e.g., (S, G) is now withdrawn at ingress routing device F) |

The different actions A1, A2, A3, A4, A5, A6, A7, A8, A9, and A10 taken by the RP in response to these triggers are generically defined as shown in Table 2 below:

TABLE 2

| ACTION | DEFINITION |
| --- | --- |
| A1 | Add Source/Group (*/S, G) in RP-dB (e.g., in stream group/source information 502 of FIG. 11) if not already existing in dB |
| A2 | Add Egress L in the RP-dB's Egress List for (*/S, G) (e.g., in egress routing device/stream information 506) |
| A3 | Add Ingress F in the RP-dB's Ingress List for (S, G) (e.g., in ingress routing device/stream information 504) |
| A4 | Remove Source/Group (*/S, G) from dB (e.g., from information stream group/source information 502) if Egress List and Ingress List for (*/S, G) are empty |
| A5 | Remove Egress L from RP-dB for (*/S, G) (e.g., from egress routing device/stream information 506) |
| A6 | Remove Ingress F from RP-dB for (*/S, G) (e.g., from ingress routing device/stream information 504) |
| A7 | When new Egress L appears for (*/S, G), traverse the Ingresses in the Ingress List for (*/S, G), For each Ingress F in the Ingress List, Send, to the Ingress F, a List-of-Receivers Register Message with Egress-Group info. (L: (*/S, G) - ADD |
| A8 | When new Ingress F appears for (*/S, G), traverse the Egresses in Egress List for (*/S, G), and For each Egress L in the Egress List, Include Egress L in the Egress-Group information for (*/S, G) that is sent to the new Ingress F in a list-of-receivers message. (L: (*/S, G) - ADD |
| A9 | When existing Egress L disappears for (*/S, G), traverse the Ingresses in the Ingress List for (*/S, G), and For each Ingress in the Ingress List, Send, to the Ingress F, a List-of-Receivers Register Message with Egress-Group info. (L: (*/S, G) - WITHDRAW |
| A10 | When existing Ingress F disappears for (*/S, G), traverse the Egresses in the Egress List for (*/S, G), and For each Egress L in the Egress List, Include Egress L in the Egress-Group information for (*/S, G) that is sent to Ingress F in a list-of-receivers message. (L: (*/S, G) - WITHDRAW |

Using the defined the triggers and actions above, the RP may perform specific groups of actions responsive to certain triggers. For example, the RP may perform the actions listed below in Table 3:

TABLE 3

| TRIGGER | ACTIONS TAKEN RESPONSIVE TO TRIGGER |
| --- | --- |
| T1 | A1, A2, A7 |
| T2 | A1, A3, A8 |
| T3 | A9, A5, A4 |
| T4 | A10, A6, A4 |

These example actions will now be described in more detail. Trigger T1 occurs when the RP receives a receiver-active register message from a particular Egress L (e.g., egress routing device L1, L2, L3, or L4) for (*/S, G). The term "(*/S, G)" indicates that either a specific source/group (S, G) may be specified (e.g., (S1, G1)), or that just a group may be specified for any source (*, G) (e.g., (*, G1)). The egress routing device specifies ADD in the receiver-active register message (e.g., using the A bit/flag, as described previously) to indicate an interest in (*/S, G). In response, the RP performs actions A1, A2, and A7. In action A1, the RP populates (*/S, G) in the RP-dB (e.g., in stream group/source information 502) to enable future tracking. In action A2, the RP tracks the Egress L to update Ingresses with any future updates of state. Accordingly, the RP adds Egress L to the Egress List for (*/S,G) (e.g., in egress routing device/stream information 506). In action A7, RP determines if there are ingress routing devices that have sent a source-active register message for (*/S, G). RP traverses the Ingresses in the Ingress List for (*/S,G) (e.g., in ingress routing device/stream information 504), and for each Ingress F that is included in this list, the RP sends, to the respective Ingress F, a list-of-receivers register message with the Egress-group information (L: (*/S, G))–ADD. In the list-of-receivers message, for (*/S, G), the message includes identifiers (e.g., addresses) of each Egress L that has expresses interest in (*/S, G).

As one non-limiting example, T1 may occur if RP receives a receiver-active register message from Egress L1 expressing interest (ADD) for (S5, G5). In response, the RP performs actions A1, A2, and A7. In action A1, the RP populates (S5, G5) in the RP-dB, if not already present. In action A2, the RP adds Egress L1 to the Egress List for (S5, G5). In action A7, the RP determines if there are ingress routing devices that have sent a source-active register message for (S5, G5). The RP traverses the Ingresses in the Ingress List for (S5, G5), and for each Ingress that is included in this list, the RP sends, to the respective Ingress, a list-of-receivers register message to indicate which egress routing devices have expressed interest in (S5, G5). In this particular example, as indicated in FIG. 10, Ingress F5 may be the only Ingress in the list for (S5, G5). The RP may sent Ingress F5 the list-of-receivers message, which identifies Egress L1 as expressing interest in receiving data for (S5, G5).).

Trigger T2 occurs when the RP receives a source-active register message for (S, G) from Ingress F, to indicate that (S, G) is active at Ingress F for multicast data forwarding. The ingress routing device specifies ADD in the source-active register message (e.g., using the A bit/flag, as described previously) to indicate that (*/S, G) is active. The RP, in response, performs actions A1, A3, and A8. In action A1, the RP populates (S, G) in the RP-dB, if not already present, to enable future tracking. In action A3, the RP track the Ingress F to update the Ingress with any future updates of state. Accordingly, the RP adds Ingress F to the Ingress List for (S, G). In action A8, the RP determines if there are Egresses that have sent receiver-active register message for (*/S, G), as Egresses may have expressed in (S, G) or any source for G, such as (*, G). The RP traverses the Egresses in the Egress List for (*/S, G), and for each Egress L, the RP includes Egress L in the Egress-Group information for (*/S, G) that is sent to the new Ingress F in a list-of-receivers message (L: (*/S, G)–ADD. In the list-of-receivers message, for (*/S, G), the message includes identifiers (e.g., addresses) of each Egress L that has expresses interest in (*/S, G).

As one non-limiting example, T2 may occurs when the RP receives a source-active register message from Ingress F4 for (S4, G4), as illustrated in FIG. 10, to indicate that (S4, G4) is active at Ingress F4 for multicast data forwarding. The RP, in response, performs actions A1, A3, and A8. In action A1, the RP populates (S4, G4) in the RP-dB, if not already present, to enable future tracking. In action A3, the RP track the Ingress F4 to update the Ingress with any future updates of state. Accordingly, the RP adds Ingress F4 to the Ingress List for (S4, G4). In action A8, the RP determines if there are Egresses that have sent receiver-active register message for (S4, G4) or just (*, G4). The RP traverses the Egresses in the Egress List for (S4, G4), and for each Egress in the list, the RP includes that Egress in the Egress-Group information for (S4, G4) that is sent to Ingress F4 in a list-of-receivers message. In the example shown in FIG. 10, there are no such egress routing devices that have expressed interest specifically in (S4, G4). However, the RP also traverses the Egresses in the Egress List for (*, G4), and for each Egress, the RP includes the Egress in the Egress-Group information for (*, G4) that is sent to Ingress F4 in a list-of-receivers message. As a result, the list-of-receivers message indicates which egress routing devices have expressed interest in (S4, G4) or (*, G4). In the example shown in FIG. 10, Egress L4 has expressed interest in (*, G4). Accordingly, the RP sends Ingress F4 a list-of-receivers message to indicate that Egress L4 is interested in (*, G4). In the list-of-receivers message, the source address for (*, G4) may comprise a wildcard character to indicate any source, the group address may comprise an address for G4, and the egress routing identifier may comprise an address of Egress L4.

Regarding the additional triggers T3 and T4, trigger T3 occurs when the RP receives a receiver-active register message from a particular Egress L, indicating that this Egress L has no interest, or has withdrawn interest, in (*/S, G). The egress routing device specifies WITHDRAW in the receiver-active register message (e.g., using the A bit/flag, as described previously) to indicate no interest, or withdrawn interest, in (*/S, G). In response, the RP performs actions A9, A5, and A4. In action A9, the RP determines if there are ingress routing devices that have sent a source-active register message for (*/S, G). The RP traverses the Ingresses in the Ingress List for (*/S,G) (e.g., in ingress routing device/stream information 504), and for each Ingress F that is included in this list, the RP sends, to the respective Ingress F, a list-of-receivers register message with the Egress-group information (L: (*/S, G))–WITHDRAW. In the list-of-receivers message, for (*/S, G), the message includes identifiers (e.g., addresses) of each Egress L that has withdrawn interest in (*/S, G). In action A5, the RP removes Egress L from the Egress List for (*/S, G) in the RP-dB (e.g., in egress routing device/stream information 506). In action A4, the RP removes (*/S, G) from the RP-dB (e.g., from stream group/source information 502) if the Egress List and the Ingress list for (*/S, G) are each empty.

Trigger T4 occurs when the RP receives a source-active register message for (S, G) from Ingress F, to indicate that (S, G) is withdrawn and no longer active at Ingress F for multicast data forwarding. The RP, in response, performs actions A10, A6, and A4. In action A10, the RP determines if there are egress routing devices that have sent a receiver-active register message to indicate an interest in (*/S, G). The RP traverses the Egresses in the Egress List for (*/S, G) (e.g., in egress routing device/stream information 506), and for each Egress L that is included in this list, the RP includes Egress L in the Egress-Group information for (*/S, G) that is sent to Ingress F in a list-of-receivers message (L: (*/S, G))–WITHDRAW. In the list-of-receivers message, for (*/S, G), the message includes identifiers (e.g., addresses) of each Egress L for (*/S, G). In action A6, the RP removes Ingress F from Ingress List for (*/S, G) in the RP-dB (e.g., in ingress routing device/stream information 504). In action A4, the RP removes (*/S, G) from the RP-dB (e.g., from stream group/source information 502) if the Egress List and the Ingress list for (*/S, G) are each empty.

By way of the techniques described above, the forwarding ingress routing devices, including new ingresses, may become aware of any new egress routing devices that have expressed interest for a particular group or source/group. Also, with the above tracking of ingress and egress routing devices, the RP keeps its state in sync with the network and it may update the ingress routing devices with the latest, accurate information in a reliable and swift manner.

FIG. 12 is a flow diagram illustrating an example process 600 that may be implemented by a routing device, such as by one or more of the routing devices shown in FIGS. 1-6. Process 600 includes operations 602, 604, and 606, as well as various other possible operations recited below.

A first routing device (e.g., central routing device 20) exchanges, with a second routing device (e.g., ingress routing device 8), a plurality of targeted hello messages (e.g., targeted hello messages 30, 32) (e.g., using the PIM protocol) to establish a targeted neighbor connection (e.g., targeted neighbor connection 24) between the first routing device and the second routing device, wherein one of the first routing device or the second routing device comprises a central routing device, and wherein another one of the first routing device or the second routing device comprises an ingress routing device communicatively coupled to at least one source device (e.g., source device 2, 4) (602).

The first routing device processes, using the targeted neighbor connection with the second routing device, a source-active register message (e.g., source-active register message 34A, 34N) that specifies a source address and an identifier (e.g., a group address) that are collectively associated with a multicast stream provided by the at least one source device, and wherein the source-active register message further indicates whether the multicast stream is active or withdrawn (604). After processing the source-active register message, the first routing device processes, using the targeted neighbor connection with the second routing device, a list-of-receivers register message (e.g., list-of-receivers register message 54A, 54N) that specifies an egress routing device (e.g., egress routing device 14) and at least the identifier that is associated with the multicast stream, wherein the list-of-receivers register message further indicates whether or not the egress routing device requests receipt of data associated with the multicast stream (606).

The targeted neighbor connection may comprise a reliable transport connection, the first routing device may comprise the central routing device, and the second routing device comprises the ingress routing device. Exchanging the plurality of targeted hello messages may comprise receiving, by the central routing device and from the ingress routing device, a first targeted hello message comprising a first unicast message that is addressed to the central routing device, and sending, by the central routing device and to the ingress routing device, a second targeted hello message to acknowledge receipt of the first targeted hello message, wherein the second targeted hello message comprises a second unicast message that is addressed to the ingress routing device. In this example, processing the source-active register message comprises receiving, by the central routing device and from the ingress routing device using the targeted neighbor connection, the source-active register message that indicates whether the multicast stream is active or withdrawn at the ingress routing device, and processing the list-of-receivers register message comprises sending, from the central routing device and to the ingress routing device using the targeted neighbor connection, the list-of-receivers register message.

Process 600 may include updating, by the central routing device and based on the source-active register message, state information for multicast streams that are active at the ingress routing device, wherein if the source-active register message indicates that the multicast stream is active, the central routing device adds the source address and the identifier to the state information, and wherein if the source-active register message indicates that the multicast stream is withdrawn, the central routing device removes the source address and the identifier from the state information.

In some cases, the list-of-receivers register message further specifies the source address that is associated with the multicast stream. The source address of the list-of-receivers register message may, in some cases, specify any source that is associated with the group address for the multicast stream (e.g., using a wildcard address for the source address).

The identifier may comprise a group address and the source-active register message may include a plurality of multicast stream data elements, wherein each multicast stream data element of the source-active register message specifies a particular source address and a particular group address that are collectively associated with a respective multicast stream. Each multicast stream data element of the source-active register message may further indicate whether the respective multicast stream is active or withdrawn.

In some examples, the identifier comprises a group address, the plurality of targeted hello messages comprises a first plurality of targeted hello messages, the targeted neighbor connection comprises a first targeted neighbor connection, the first routing device comprises the central routing device, and the second routing device comprises the ingress routing device. In these examples, process 600 may further comprise, before processing the list-of-receivers register message, exchanging, by the central routing device and with the egress routing device, a second plurality of targeted hello messages (e.g., using the PIM protocol) to establish a second targeted neighbor connection (e.g., targeted neighbor connection 26) between the central routing device and the egress routing device, and receiving, by the central routing device using the second targeted neighbor connection with the egress routing device, a receiver-active register message (e.g., receiver-active register message 44A, 44N) that specifies at least the group address that is associated with the multicast stream, and wherein the receiver-active register message further indicates whether or not the egress routing device requests receipt of data associated with the multicast stream.

In some cases, the receiver-active register message further specifies the source address that is associated with the multicast stream. The source address of the receiver-active register message may, in some cases, specify any source that is associated with the group address for the multicast stream (e.g., using a wildcard address for the source address). The receiver-active register message may include a plurality of multicast stream data elements, wherein each multicast stream data element of the receiver-active register message specifies at least a particular group address that is associated with a respective multicast stream, and wherein each multicast stream data element of the receiver-active register message further indicates whether or not the egress routing device requests receipt of data associated with the respective multicast stream.

In some examples, the egress routing device comprises a first egress routing device, and the receiver-active register message comprises a first receiver-active register message. In these examples, process 600 further comprises, before processing the list-of-receivers register message, exchanging, by the central routing device and with a second egress routing device, a third plurality of targeted hello messages (e.g., using the PIM protocol) to establish a third targeted neighbor connection between the central routing device and the second egress routing device, and receiving, by the central routing device using the third targeted neighbor connection with the second egress routing device, a second receiver-active register message that specifies at least the group address that is associated with the multicast stream, and wherein the second receiver-active register message further indicates whether or not the second egress routing device requests receipt of data associated with the multicast stream. Furthermore, in these examples, processing the list-of-receivers register message may comprise sending, from the central routing device and to the ingress routing device using the first targeted neighbor connection, the list-of-receivers register message, wherein the list-of-receivers register message further specifies the second egress routing device and at least the group address that is associated with the multicast stream, and wherein the list-of-receivers register message further indicates whether or not the second egress routing device requests receipt of data associated with the multicast stream.

In some examples, processing the list-of-receivers register message may further include specifying one or more additional ingress routing devices that have each established a respective targeted neighbor connection with the central routing device and that have previously sent the central routing device a respective source-active register message specifying at least the group address, and sending, from the central routing device and to each of the one or more additional ingress routing devices, the list-of-receivers message.

In some examples, the plurality of targeted hello messages comprise a first plurality of targeted hello messages, the targeted neighbor connection comprises a first targeted neighbor connection, the first routing device comprises the central routing device, wherein the second routing device comprises the ingress routing device, the ingress routing device comprises a first ingress routing device, and the source-active register message comprises a first source-active register message. In these examples, process 600 further comprises exchanging, by the central routing device and with a second ingress routing device, a second plurality of targeted hello messages (e.g., using the PIM protocol) to establish a second targeted neighbor connection between the central routing device and the second ingress routing device, receiving, by the central routing device using the second targeted neighbor connection with the second ingress routing device, a second source-active register message that specifies the source address and the group address that are collectively associated with the multicast stream, and wherein the second source-active register message further indicates whether the multicast stream is active or withdrawn at the second ingress routing device. Processing the list-of-receivers register message may comprise sending, from the central routing device and to the first ingress routing device using the first targeted neighbor connection, the list-of-receivers register message, wherein process 600 further comprises sending, from the central routing device and to the second ingress routing device using the second targeted neighbor connection, the list-of-receivers register message.

In some examples, the targeted neighbor connection comprises a reliable transport connection, the first routing device comprises the ingress routing device and the second routing device comprises the central routing device, and processing the source-active register message comprises sending, by the ingress routing device and to the central routing device using the targeted neighbor connection, the source-active register message. In these examples, processing the list-of-receivers register message comprises receiving, by the ingress routing device and from the central routing device using the targeted neighbor connection, the list-of-receivers register message, and process 600 further comprises, responsive to determining that the list-of-receivers register message indicates that the egress routing device requests receipt of data associated with the multicast stream, sending, from the ingress routing device and to the egress routing device, multicast data packets associated with the multicast stream. Sending the multicast data packets may further comprise generating a packet header that indicates the egress routing device, and sending the packet header with each of the multicast data packets to the egress routing device via one or more intermediate routing devices.

In some examples, a system comprises means for implementing any of techniques described herein, including the techniques described above in reference to FIG. 12. In some examples, a computer-readable storage medium comprising instructions that, when executed, cause one or more processors to implement any of the techniques described herein, including the techniques described above in reference to FIG. 12.

The techniques described in this disclosure may be implemented, at least in part, in hardware, software, firmware or any combination thereof. For example, various aspects of the described techniques may be implemented within one or more processors, including one or more microprocessors, digital signal processors (DSP's), application specific integrated circuits (ASIC's), field programmable gate arrays (FPGA's), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform one or more operations of a method, e.g., when the instructions are executed. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the disclosure have been described. These and other examples are within the scope of the following claims.

The invention claimed is:

1. A method comprising:
exchanging, by an ingress routing device and with a central routing device, a plurality of targeted hello messages to establish a targeted neighbor connection between the ingress routing device and the central routing device, wherein the ingress routing device is communicatively coupled to at least one source device;
sending, by the ingress routing device and to the central routing device using the targeted neighbor connection, a source-active register message that specifies a source address and an identifier that are associated with a multicast stream provided by the at least one source device, wherein the source-active register message indicates that the multicast stream is active at the ingress routing device;
after sending the source-active register message that indicates the multicast stream is active at the ingress routing device, receiving, by the ingress routing device and from the central routing device using the targeted neighbor connection, a list-of-receivers register message that specifies an egress routing device and at least the identifier that is associated with the multicast stream, wherein the list-of-receivers register message further indicates that the egress routing device requests receipt of data associated with the multicast stream; and
after receiving the list-of-receivers register message, sending, by the ingress routing device and to the egress routing device, the data associated with the multicast stream when the multicast stream is active.

2. The method of claim 1, further comprising:
updating, by the ingress routing device and based on the list-of-receivers register message, state information to indicate that the egress routing device requests receipt of the data associated with the multicast stream, wherein the state information includes an address of the egress routing device and at least the identifier associated with the multicast stream.

3. The method of claim 1, wherein exchanging the plurality of targeted hello messages comprises:
sending, by the ingress routing device and to the central routing device using the targeted neighbor connection, a first targeted hello message comprising a first unicast message that is addressed to the central routing device; and
receiving, by the ingress routing device and from the central routing device using the targeted neighbor connection, a second targeted hello message to acknowledge receipt of the first targeted hello message by the central routing device, wherein the second targeted hello message comprises a second unicast message that is addressed to the ingress routing device.

4. The method of claim 1, wherein the list-of-receivers register message further specifies the source address that is associated with the multicast stream.

5. The method of claim 1, wherein the identifier comprises a group address associated with the multicast stream, wherein the source-active register message includes a plurality of multicast stream data elements, wherein each multicast stream data element of the source-active register message specifies a particular source address and a particular group address that are associated with a respective multicast stream, and wherein each multicast stream data element of the source-active register message further indicates whether the respective multicast stream is active or withdrawn.

6. The method of claim 1,
wherein the egress routing device comprises a first egress routing device,
wherein the list-of-receivers register message further specifies a second egress routing device and at least the identifier associated with the multicast stream,
wherein the list-of-receivers register message further indicates that the second egress routing device requests receipt of the data associated with the multicast stream, and
wherein sending the data associated with the multicast stream comprises sending, by the ingress routing device and to each of the first egress routing device and the second routing device, the data associated with the multicast stream.

7. The method of claim 1, wherein the source-active register message comprises a first source-active register message, and wherein the method further comprises:
after sending the data associated with the multicast stream to the egress routing device, sending, by the ingress routing device and to the central routing device using the targeted neighbor connection, a second source-active register message specifying the source address and the identifier that are associated with the multicast stream provided by the at least one source device, wherein the second source-active register message indicates that the multicast stream is withdrawn and no longer active at the ingress routing device.

8. The method of claim 1, wherein the list-of-receivers register message comprises a first list-of-receivers register message, and wherein the method further comprises:
after sending the data associated with the multicast stream to the egress routing device, receiving, by the ingress routing device and from the central routing device using the targeted neighbor connection, a second list-of-receivers register message that specifies the egress routing device and at least the identifier associated with the multicast stream, wherein the second list-of-receivers register message further indicates that the egress routing device no longer requests receipt of further data associated with the multicast stream; and
after receiving the second list-of-receivers register message, refraining, by the ingress routing device, from sending the further data associated with the multicast stream to the egress routing device.

9. The method of claim 8, further comprising:
updating, by the ingress routing device and based on the second list-of-receivers register message, state information to indicate that the egress routing device no longer requests receipt of the data associated with the multicast stream, wherein the state information includes an address of the egress routing device and at least the identifier associated with the multicast stream.

10. The method of claim 1, wherein exchanging the plurality of targeted hello messages comprises exchanging, by the ingress routing device and with the central routing device, the plurality of targeted hello messages using a Protocol Independent Multicast (PIM) protocol to establish the targeted neighbor connection between the ingress routing device and the central routing device, and wherein the central routing device comprises a rendezvous point.

11. An ingress routing device, comprising:
a memory; and
at least one processor in communication with the memory, the at least one processor being configured to:
exchange, with a central routing device, a plurality of targeted hello messages to establish a targeted neighbor connection between the ingress routing device and the central routing device, wherein the ingress routing device is communicatively coupled to at least one source device;
send, to the central routing device using the targeted neighbor connection, a source-active register message that specifies a source address and an identifier that are associated with a multicast stream provided by the at least one source device, wherein the source-active register message indicates that the multicast stream is active at the ingress routing device;
after sending the source-active register message that indicates the multicast stream is active at the ingress routing device, receive, from the central routing device using the targeted neighbor connection, a list-of-receivers register message that specifies an egress routing device and at least the identifier that is associated with the multicast stream, wherein the list-of-receivers register message further indicates that the egress routing device requests receipt of data associated with the multicast stream; and
after receiving the list-of-receivers register message, send, to the egress routing device, the data associated with the multicast stream when the multicast stream is active.

12. The ingress routing device of claim 11, wherein the at least one processor is further configured to:
update, based on the list-of-receivers register message, state information to indicate that the egress routing device requests receipt of the data associated with the multicast stream, wherein the state information includes an address of the egress routing device and at least the identifier associated with the multicast stream.

13. The ingress routing device of claim 11, wherein the at least one processor is configured to exchange the plurality of targeted hello messages at least by being configured to:
send, to the central routing device using the targeted neighbor connection, a first targeted hello message comprising a first unicast message that is addressed to the central routing device; and
receive, from the central routing device using the targeted neighbor connection, a second targeted hello message to acknowledge receipt of the first targeted hello message by the central routing device, wherein the second targeted hello message comprises a second unicast message that is addressed to the ingress routing device.

14. The ingress routing device of claim 11, wherein the list-of-receivers register message further specifies the source address that is associated with the multicast stream.

15. The ingress routing device of claim 11, wherein the identifier comprises a group address associated with the multicast stream, wherein the source-active register message includes a plurality of multicast stream data elements, wherein each multicast stream data element of the source-active register message specifies a particular source address and a particular group address that are associated with a respective multicast stream, and wherein each multicast stream data element of the source-active register message further indicates whether the respective multicast stream is active or withdrawn.

16. The ingress routing device of claim 11,
wherein the egress routing device comprises a first egress routing device,
wherein the list-of-receivers register message further specifies a second egress routing device and at least the identifier associated with the multicast stream,
wherein the list-of-receivers register message further indicates that the second egress routing device requests receipt of the data associated with the multicast stream, and
wherein the at least one processor is configured to send the data associated with the multicast stream at least by being configured to send, to each of the first egress routing device and the second routing device, the data associated with the multicast stream.

17. The ingress routing device of claim 11, wherein the source-active register message comprises a first source-active register message, and wherein the at least one processor is further configured to:
after sending the data associated with the multicast stream to the egress routing device, send, to the central routing device using the targeted neighbor connection, a second source-active register message specifying the source address and the identifier that are associated with the multicast stream provided by the at least one source device, wherein the second source-active register message indicates that the multicast stream is withdrawn and no longer active at the ingress routing device.

18. The ingress routing device of claim 11, wherein the list-of-receivers register message comprises a first list-of-receivers register message, and wherein the at least one processor is further configured to:
after sending the data associated with the multicast stream to the egress routing device, receive, from the central routing device using the targeted neighbor connection, a second list-of-receivers register message that specifies the egress routing device and at least the identifier associated with the multicast stream, wherein the second list-of-receivers register message further indicates that the egress routing device no longer requests receipt of further data associated with the multicast stream; and
after receiving the second list-of-receivers register message, refrain from sending the further data associated with the multicast stream to the egress routing device.

19. The ingress routing device of claim 18, wherein the at least one processor is further configured to:
update, based on the second list-of-receivers register message, state information to indicate that the egress routing device no longer requests receipt of the data associated with the multicast stream, wherein the state information includes an address of the egress routing device and at least the identifier associated with the multicast stream.

20. The ingress routing device of claim 11, wherein the at least one processor is configured to exchange the plurality of targeted hello messages at least by being configured to exchange, with the central routing device, the plurality of targeted hello messages using a Protocol Independent Multicast (PIM) protocol to establish the targeted neighbor connection between the ingress routing device and the central routing device, and wherein the central routing device comprises a rendezvous point.

21. A computer-readable storage medium comprising instructions that, when executed, cause one or more processors of an ingress routing device to perform operations comprising:
exchanging, with a central routing device, a plurality of targeted hello messages to establish a targeted neighbor connection between the ingress routing device and the central routing device, wherein the ingress routing device is communicatively coupled to at least one source device;
sending, to the central routing device using the targeted neighbor connection, a source-active register message that specifies a source address and an identifier that are associated with a multicast stream provided by the at least one source device, wherein the source-active register message indicates that the multicast stream is active at the ingress routing device;
after sending the source-active register message that indicates the multicast stream is active at the ingress routing device, receiving, from the central routing device using the targeted neighbor connection, a list-of-receivers register message that specifies an egress routing device and at least the identifier that is associated with the multicast stream, wherein the list-of-receivers register message further indicates that the egress routing device requests receipt of data associated with the multicast stream; and
after receiving the list-of-receivers register message, sending, to the egress routing device, the data associated with the multicast stream when the multicast stream is active.

22. The computer-readable storage medium of claim 21, wherein the operations further comprise:
updating, based on the list-of-receivers register message, state information to indicate that the egress routing device requests receipt of the data associated with the multicast stream, wherein the state information includes an address of the egress routing device and at least the identifier associated with the multicast stream.

23. The computer-readable storage medium of claim 21, wherein exchanging the plurality of targeted hello messages comprises:
sending, to the central routing device using the targeted neighbor connection, a first targeted hello message comprising a first unicast message that is addressed to the central routing device; and
receiving, from the central routing device using the targeted neighbor connection, a second targeted hello message to acknowledge receipt of the first targeted hello message by eht central routing device, wherein the second targeted hello message comprises a second unicast message that is addressed to the ingress routing device.

24. The computer-readable storage medium of claim 21, wherein the list-of-receivers register message further specifies the source address that is associated with the multicast stream.

25. The computer-readable storage medium of claim 21, wherein the identifier comprises a group address associated with the multicast stream, wherein the source-active register message includes a plurality of multicast stream data elements, wherein each multicast stream data element of the source-active register message specifies a particular source address and a particular group address that are associated with a respective multicast stream, and wherein each multicast stream data element of the source-active register message further indicates whether the respective multicast stream is active or withdrawn.

26. The computer-readable storage medium of claim 21, wherein the egress routing device comprises a first egress routing device, wherein the list-of-receivers register message further specifies a second egress routing device and at least the identifier associated with the multicast stream, wherein the list-of-receivers register message further indicates that the second egress routing device requests receipt of the data associated with the multicast stream, and wherein sending the data associated with the multicast stream comprises sending, to each of the first egress routing device and the second routing device, the data associated with the multicast stream.

27. The computer-readable storage medium of claim 21, wherein the source-active register message comprises a first source-active register message, and wherein the operations further comprise:

after sending the data associated with the multicast stream to the egress routing device, sending, to the central routing device using the targeted neighbor connection, a second source-active register message specifying the source address and the identifier that are associated with the multicast stream provided by the at least one source device, wherein the second source-active register message indicates that the multicast stream is withdrawn and no longer active at the ingress routing device.

28. The computer-readable storage medium of claim 21, wherein the list-of-receivers register message comprises a first list-of-receivers register message, and wherein the operations further comprise:

after sending the data associated with the multicast stream to the egress routing device, receiving, from the central routing device using the targeted neighbor connection, a second list-of-receivers register message that specifies the egress routing device and at least the identifier associated with the multicast stream, wherein the second list-of-receivers register message further indicates that the egress routing device no longer requests receipt of further data associated with the multicast stream; and after receiving the second list-of-receivers register message, refraining, from sending the further data associated with the multicast stream to the egress routing device.

29. The computer-readable storage medium of claim 28, wherein the operations further comprise:

updating, based on the second list-of-receivers register message, state information to indicate that the egress routing device no longer requests receipt of the data associated with the multicast stream, wherein the state information includes an address of the egress routing device and at least the identifier associated with the multicast stream.

30. The computer-readable storage medium of claim 21, wherein exchanging the plurality of targeted hello messages comprises exchanging, with the central routing device, the plurality of targeted hello messages using a Protocol Independent Multicast (PIM) protocol to establish the targeted neighbor connection between the ingress routing device and the central routing device, and wherein the central routing device comprises a rendezvous point.

* * * * *

UNITED STATES PATENT AND TRADEMARK OFFICE
CERTIFICATE OF CORRECTION

PATENT NO. : 10,476,793 B2  
APPLICATION NO. : 15/815993  
DATED : November 12, 2019  
INVENTOR(S) : Vikram Nagarajan, Anish Peter and Robert W. Kebler Page 1 of 1

It is certified that error appears in the above-identified patent and that said Letters Patent is hereby corrected as shown below:

In the Claims

Column 44, Line 46 (Claim 23): Replace "by eht central" with --by the central--

Signed and Sealed this  
First Day of September, 2020

Andrei Iancu  
*Director of the United States Patent and Trademark Office*